United States Patent [19]
Waldenmaier

[11] Patent Number: 5,774,569
[45] Date of Patent: Jun. 30, 1998

[54] SURVEILLANCE SYSTEM

[76] Inventor: H. Eugene W. Waldenmaier, One Barksdale Rd., White Plains, N.Y. 10607

[21] Appl. No.: 762,927

[22] Filed: Dec. 10, 1996

Related U.S. Application Data

[63] Continuation of Ser. No. 279,916, Jul. 25, 1994, abandoned.

[51] Int. Cl.⁶ ............................................. G06K 9/00
[52] U.S. Cl. ........................... 382/100; 348/143; 382/104
[58] Field of Search .................... 382/100, 103, 382/104; 348/148, 149, 143, 146; 364/436, 437

[56] References Cited

U.S. PATENT DOCUMENTS

| | | | |
|---|---|---|---|
| 3,203,328 | 8/1965 | Brueggeman . | |
| 4,847,772 | 7/1989 | Michalopoulos | 364/436 |
| 4,877,317 | 10/1989 | Gibbons et al. | 350/559 |
| 5,023,712 | 6/1991 | Kajiwara | 358/105 |
| 5,161,107 | 11/1992 | Mayeaus et al. | 364/436 |
| 5,287,218 | 2/1994 | Chen | 359/365 |
| 5,301,239 | 4/1994 | Toyama et al. | 382/104 |
| 5,402,118 | 3/1995 | Aoki | 382/104 |
| 5,404,306 | 4/1995 | Mathur et al. | 382/104 |
| 5,467,402 | 11/1995 | Okuyama et al. | 382/104 |

*Primary Examiner*—Yon Couso
*Attorney, Agent, or Firm*—Vincent J. Vasta, Jr.

[57] ABSTRACT

A Single optical element that also provides the structural support between optical elements, the alignment stability between optical elements, the weatherized window (environmental enclosure), and minimizes, or eliminates, central obscuration for a distortion free, wide field of view (a panoramic ±80°) optical surveillance system is disclosed. Simultaneously, the logic for a learn mode eliminates the need for programming "the location of detection zones" in the data processing system e.g. for a traffic surveillance and control systems, during or after installation of the system or for the off-line data processing. The synergism of these features enables complete real-time, e.g. within seconds after learn mode adaptation, traffic analysis and reporting of an entire multi-lane, omni-directional, non-orthogonal, traffic intersection, traffic circle or roadway from a single video surveillance system with no or minimal, programming knowledge on the part of the system installer or operator.

9 Claims, 8 Drawing Sheets

SURVEILLANCE SYSTEM

This application is a continuation of application Ser. No. 08/279,916, filed Jul. 25, 1994, now abandoned.

This invention relates to an improved surveillance system for determining the presence, position and motion of objects. The output signal from the improved surveillance system may be used as the input for a traffic control system to control traffic signal lights or for a "traffic incident" detection, alert and avoidance system.

This invention further relates to an environmentally sealed surveillance system for viewing images of an unobstructed, instantaneous, distortionless panoramic view of 360 degrees in azimuth with included elevation angles exceeding +80 degrees. The invention also relates to data processing for a Single Video Camera (SVC) traffic surveillance system that eliminates all installation alignment and all programming after shipment of the system for installation. The SVC system may be preprogrammed for reporting incident detection, quantitative traffic statistics, three-dimensional image reconstruction for classification, and the identical data that are currently derived from road-embedded inductive loop traffic sensors installed within radius of 5.6 times the system installation height.

BACKGROUND OF THE INVENTION

In many currently employed traffic control systems, traffic surveillance is accomplished by means of road-embedded inductive loop traffic sensors that are hard wired and interfaced to traffic controller units. The inductive loop traffic sensors and connecting cables from the sensors to the controller units must be embedded in a road after the road surface is cut open. After installation of the inductive loop sensor systems, the road surface must be restored by patching and consequently is permanently weakened. The patched area of the roadway is subject to traffic, salt and weather damage, which results in premature failure of the sensors and roadbed. Repair or replacement of the sensors requires additional road excavation and repair. Another unavoidable problem with the installation and repair of inductive loop sensor systems is the risk of injury to installation technicians from traffic accidents. For these reasons, the inductive loop sensor systems are expensive and unreliable. Therefore, traffic engineers are searching for reliable, less expensive, alternative sensors that do not require traffic to be detoured and delayed when they are being installed.

According to the *IVHS Architecture Bulletin* (January 1994, No.1, page 2):

Congestion costs the US nearly $100 billion yearly in lost productivity. Traffic accidents approximately cost an additional $140 billion annually in lost wages and other direct costs. Together these total nearly 5% of the gross national product. Nearly $7 billion is spent by the government and truckers to enter and comply with commercial vehicle regulations. IVHS [Intelligent Vehicle Highway Systems] will improve transportation system efficiency through better routing of vehicles, automated toll collection, safety enhancements and streamlining commercial vehicle regulatory enforcement and compliance.

The IVHS Architecture is currently being developed by four competing public and private consortia, and the winning architecture is due for acceptance in 1996. The inductive loop sensors cannot provide the comprehensive surveillance data for the functions that are to be included in the architecture, including incident detection, "intelligent" traffic control, and many other functions that will be implemented in the IVHS architecture.

Before the 1970's, video camera systems have monitored objects, for example, vehicles in traffic. When camera systems were integrated with computers, the spatial and temporal classifications of objects were automated for parameters and properties of presence, motion, geometry and patterns. U.S. Pat. No. 4,847,772 (Jul. 11, 1989) describes a system for "Vehicle Detection Through Image Processing for Traffic Surveillance and Control." Improvements have been made since then, regarding techniques of detection algorithms, object tracking, and determination of velocity and distance.

The current state-of-the-art video camera systems used at intersections for traffic flow control have many limitations. For example, the present state-of-the-art commercial video camera lens assemblies do not achieve a distortionless linear image of a flat object plane with a field of view larger than about ±55 degrees. This limited field of view would require an impractical installation height exceeding 30 meters (~100 feet) to acquire the minimal surveillance area in the 45 meter (~150 feet) radius required for traffic control of an intersection. That 45 meter being a nominal radius required for an intersection with 6 traffic lanes, center island and the nominal 24 meters (about ~80 feet) in the lanes on the far side of the intersection. Because installation heights above 15 meters (~50 feet) are impractical, see FIG. 6, multiple current state-of-the-art video camera systems would be required to monitor a single intersection. Multiple cameras require the preparation of site-specific program files during system integration to adapt to unique spatial (location, height and pointing angle) variations between cameras, and scaling between object and image. This information would then be used to define detection zones for vehicle presence, and to provide the correlation between the detection zones and the traffic light control circuit. In addition, when any part of a system is installed on the far side of traffic relative to the traffic light control panel, extensive installation logistics and costly under-the-roadway cabling and conduits are required. The problems of installing the cabling and conduits and their lack of reliability are similar to the problems of installing the inductive loop sensors and their lack of reliability described above.

No reference has been found of an application or concept for a Single Video Camera (SVC) surveillance system that acquires and processes the intelligence of an entire traffic intersection, that emulates every function executed by the presently used road-embedded inductive loop traffic sensors and that would not have the disadvantages of the loop sensors described above.

Similarly, no reference has been found describing a system that has a self-learn mode thereby allowing one to dispense with site-specific programming, during or after installation, for a video camera data acquisition system to be used in the operation of the traffic light controller. In addition, no reference has been found for accurate reconstruction of three-dimensional imagery for object classification by use of a single wide field of view system. No reference was found describing a traffic monitoring system that can be implemented as a wireless system.

There is no commercially available off-the-shelf lens assembly for a small format video camera that would provide a simultaneous view of 360 degrees in azimuth and the entire area located 10 degrees below horizon in elevation. The term "small format" generally refers to a detector array size with a diagonal dimension of 12.7 mm (0.5 inch) or less. Consequently, the unique optical subsystem described herein was invented.

It is an object of the present invention to provide a surveillance system that can operate with a single video camera to cover a 360 degree azimuth for all areas that are about 10 degrees below horizon in elevation.

It is an object of the present invention to provide a surveillance system with a distortionless, fixed scaling in orthogonal Cartesian coordinates between a flat object plane normal to the camera's optical axis and the image plane of the detector array. The fixed scaling simplifies the data processing, that is to say, constant velocity objects will provide constant velocity images.

It is another object of the present invention to provide a traffic surveillance system that can be conveniently mounted on traffic signal or utility poles that currently exist at traffic intersections.

Yet another object of this invention is to provide a traffic surveillance system that does not require extensive installation logistics and costly underground cabling and conduits.

Another object of this invention is to provide a traffic surveillance systems that requires no on site programming during or after installation.

It is a still further object of this invention to provide a traffic surveillance system that does not require site-specific program files after installation to accommodate unique spatial separations between cameras location, height and pointing angle), scaling between object and image, and definition of the detection zones for vehicle presence, or to provide the correlation between the detection zones and the traffic light control circuit.

It is another object of the present invention to provide a surveillance system as a compact self-contained unit that is impervious to adverse environmental conditions.

It is another object of the present invention to provide a surveillance system that can be integrated into control systems either on a wired or wireless basis.

It is another object of the present invention to provide a surveillance system in a unit that requires low power to operate, and can therefore be solar powered.

It is another object of the present invention to provide a surveillance system that can execute every function of existing road-embedded inductive loop traffic sensor systems, plus the closed loop traffic light controller functions of existing camera-based systems.

It is another object of the present invention to provide a self-contained surveillance system that when mounted at the usual installation height is unobtrusive and therefore less likely to be damaged by vandals or stolen by thieves.

It is another object of the present invention to provide a surveillance system that is generally much less costly than prior art systems, particularly those requiring multiple cameras to acquire multiple images in a field of view of 360 degrees in azimuth.

It is another object of the invention to provide a traffic surveillance system that will be compatible with the IVHS architecture that will be adopted in 1996.

These and other objects and advantages of the invention will be described more fully below.

SUMMARY OF THE INVENTION

Generally, the novel system of the invention is a synergism of 6 novel features:

1. The optical system can provide a distortionless field of view that equals ±80 degrees from the optical axis with a non obscured 360 degree panorama. In one configuration, the system is comprised of an aspheric mirror, refractive lens assembly, and a transparent optical enclosure. These novel optics provide a linear Cartesian image of a flat Cartesian object plane that is nominally normal to the optical axis.

2. The novel optical window (enclosure with no obscuration) that also maintains the alignment, structural support, and environmental protection between the mirror, the refractive lens elements, and the detector's focal plane.

3. The automated and continuous definition of the "alignment and scaling functions" between predicted traffic pattern locations (from engineering drawings and studies) to the observed image space traffic pattern locations (from images of an entire area) acquired by a single camera system.

4. The automated and continuous definition of detection zone locations in image space (emulating placement of inductive loop sensors) by the application of the above "alignment and scaling functions" to the predicted detection zone location (from engineering drawings and studies).

5. The automated and standardized identification of every detection zone of any area for a standardized interface to any traffic controller or data acquisition system for an area or intersection. (The automated 32 detection zone definition satisfies more than 95 percent of all traffic intersections.)

6. The processing of all imagery and data within the SVC to maintain a data rate of 32 data words per processed frame (nominally 5 processed frames per second).

Generally, the optical system's minimum field of view is 360 degrees in azimuth by more than ±65 degrees in elevation. With the systems nominal ±80 degrees in elevation, it is able to view 95 percent of the existing vehicle traffic controller detection zones from a practical installation height.

According to the present invention, there is provided an improved surveillance system to determine the position and motion of objects in an area of interest, comprising:

(a) a means for image formation of that area of interest with a wide field of view optical system, in which the field of view is equal to or greater than the included angle of ±65 degrees from the optical axis;

(b) a means for image acquisition
  i. on photographic film or
  ii. with optoelectronic analog detectors at discrete intervals over time;

(c) a means for converting the analog signal representations of the objects in (b)(ii) to digital format;

(d) a means for comparing the time-sequenced digital data from (c) to determine object presence, location, absence, characteristics and motion, if any; and (e) a means of image formation of that area of interest with a wide field of view optical system, where wide field of view is equal to or greater than an unobstructed ±80 degrees from the optical axis with a full unobstructed 360 degrees in azimuth;

(f) a means for image acquisition with analog detectors at discrete intervals over time;

(g) a means for communicating the results from (d) to an interface unit for subsequent processing.

Based on investigation and consideration of the disadvantages of current systems, one can conclude that the ideal single camera traffic surveillance system of the invention should be installable at a nominal height of 10 meters (32.8 feet) and simultaneously view 360 degrees in azimuth and up to 55 meters (~180 feet) in radius from the point of installation, as shown in FIG. 6.

However, since there is no off-the-shelf lens assembly for a video camera that would satisfy a simultaneous distortionless view of 360 degrees in azimuth and all areas of interest below 10 degrees from the horizon in elevation, new optical system configurations were invented. These new configurations not only provide the required field of view but also provide an acceptable distortionless view of a flat surface with controlled aberrations to enhance image detection.

In addition, this system is designed:
(i) to be immune to installation misalignment,
(ii) to eliminate all post-installation programming,
(iii) to have the data processing function within the assembly in order to eliminate video coax or fiber optic cabling,
(iv) to be capable of providing a wireless installation by using a solar panel and cellular communication or other kind of telemetry, and
(v) to integrate the entire function of a smart traffic light controller system within the data processing electronics of the camera system.

In one configuration, the unique optical subsystem for this new surveillance system uses a transparent optical element with symmetry about the optical axis common to both a primary mirror and a lens assembly as shown in FIG. 1. This optical element then provides the structural integrity and alignment stability between the primary mirror, lens assembly and detection system (camera focal plane). Then, by extending this element beyond the electrooptics assembly and adding end seals, the element may also become the environmental enclosure for the entire system including the electronics. In one embodiment, a field lens is matched to an aspheric primary mirror to create an afocal assembly adaptable to any standard video camera focused at infinity. By the term "aspheric" is generally meant any surface that may be conic, such as a paraboloid, ellipsoid, or hyperboloid, or a surface that has a deliberate departure from a spheroid or the conic forms already mentioned.

When used for traffic surveillance, the invention may also include functions for the identification and encoding of data from each traffic detection zone, and then for the interpretation, encoding and transmitting of the observed information from each traffic detection zone.

When used for traffic surveillance, the systems of the invention generally incorporate:

1) a wide field of view camera for traffic surveillance;
2) preprogrammed (predicted spatial and temporal) traffic data files that are used together with empirical traffic data acquired from the wide field of view camera, to derive and maintain the alignment and scaling between objects and images that are then applied in subsequent logic to define, or refine, zone boundaries for subsequent logic;
3) empirical traffic data (without predicted traffic data files), acquired from the wide field of view camera and used to derive and maintain the scaling and alignment between objects and images, which is then applied in subsequent logic to define, or refine, the location of boundaries or zones that may be used for subsequent logic;
4) the slope of convergence, or angle between traffic motions, as a logic parameter in the automated determination of the systems application; and
5) a priori scaling between objects and images and a technique to update that scaling as a function of empirical data Consequently, a new Single Video Camera (SVC) surveillance system has been invented and demonstrated to:
A) provide the distortion-free surveillance of an entire intersection from a nominal 10 meters (~33 feet) installation height;
B) require no on-site programming, no site preparation, no road-bed intrusion or underground work, and as an option, no wiring; and
C) be capable of being retrofitted into existing traffic control systems by mounting a single camera and substitution of new traffic detection system interface cards for the traffic controller in the traffic control panel.

Typical installation and location requirements for the SVC for traffic surveillance are:
1) an unobstructed view to all areas of interest at a nominal height of 10 meters (~33 feet),
2) coarse alignment to gravity.
3) rotation (clocked in azimuth to be parallel with the main flow of traffic),
4) a shielded 4-wire low voltage cable to the traffic control panel, and
5) the substitution of a receiver card that is the interface between the sensor system and the traffic controller in the traffic control panel. The wireless version of the SVC does not require the shielded cable installation. In contrast, when any current camera system that interfaces with a traffic controller is installed or repositioned, it requires computer proficient installers, precise alignments, extensive post-alignment programming, a technician skilled in working with video coaxial cables or fiber optics, and the routing of extensive cabling plus the computer installation in the traffic control panel.

More specifically, the SVC system installation is accomplished with no programming or fine alignment after mounting as follows:
1.) The data processing electronics (DPE) accommodate any misalignment by a unique learn mode algorithm that adapts each SVC system to the uniqueness of the specific intersection through an adaptive sequence after the system is mounted. In general, there are two learn modes within each SVC. One is for the condition where the DPE had been preprogrammed with a "Site File" to define the exact location of each traffic lane's centerline and each detection zone in the same dimensional units used to define the scaling relationship between object (engineering site drawings) and image space. The second learn mode is used when "Site Files" are not required because the application is considered to be a "standard". Standard applications are those where the SVC is used to monitor traffic in parallel lanes with no intersection or where an intersection only has "orthogonal straight through" lanes with no lanes for "turning or parking" and where the traffic density is nearly equal in all parallel lanes. For standard applications, the exact relationship between the traffic centerlines and detection zone are predefined.
2.) The geometric prescription for the optical system and for the camera's detector is precisely known so that a scaling function between real and pixel space can be established and defined in a scaling matrix.
3.) The observed image centroids of moving traffic objects are curve fitted to define the centerlines of the traffic pattern in image space. Based on the correlation of the predicted and observed traffic centerlines, the scaling is updated and then applied to transfer the exact location of detector zone boundaries into image space.
4.) Each detection zone is pre-identified and its location is coded, by use of an algorithm, for compatibility to a fixed 32-word data transmission string, which provides the entire information content required by a traffic light controller. Each word is a data package for a given detection zone in the data transmission string and is expandable beyond one bit to provide more than two data states (i.e., present and not present) per detection zone.

5.) Data transfer rate reduction may be accomplished by incorporating all data acquisition, reduction, and processing for the entire intersection within a single camera assembly. Ultimately, the entire traffic controller for a single intersection could be contained within this assembly.

Installation then only requires the adaption to the existing traffic controller interface and the mounting of the camera assembly to provide direct line of sight to the area of interest from a height that is nominally 10 degrees above the detection area edge. A camera mounted at a 10 meter height has an excellent detection over an area with a 55 meter (~180 feet) radius.

Many surprising benefits result from the surveillance system of the invention:

(A) The system can function with only a single video camera to acquire and process images of objects in a desired area in a field of view of 360 degrees in azimuth.

(B) The system can be provided as a compact self-contained unit impervious to adverse environmental conditions.

(C) The SVC system can be integrated into intersection controller systems either on a wired or wireless basis.

(D) The system of the invention is compact and unobtrusive and when mounted at the usual installation heights, therefore less likely to be damaged by vandals or stolen by thieves.

(E) The system of the invention is generally much less costly than prior art systems, particularly those requiring multiple cameras to acquire multiple images in a field of view of 360 degree azimuth.

(F) The extreme wide field of view and distortionless imagery permits the enhanced correlation of two dimensional image change as a function of field angle, thereby allowing the reconstruction of the three dimensional (3-D) object for limited vehicle classification.

(G) If two systems of the invention are used for the simultaneous viewing of a common area from two widely separated positions, object occultations will be minimized, the 3-D data processing will be optimized, and redundancy will be provided for fail safe operation. However, if one system fails, the remaining system would continue to acquire and process data with minimal degradation of traffic control data for the area, providing adequate traffic control.

The benefits mentioned above are illustrative of the many surprising benefits derived from the novel systems of the invention.

The construction and obvious advantages of the improved surveillance system and its components provided for in the present invention will be more clearly understood from the following description of the various specific embodiments when read in conjunction with the accompanying drawings.

PREFERRED EMBODIMENTS OF THE INVENTION

Generally, the invention preferably comprises a surveillance system to determine the presence of objects in an area of interest, comprising:

(a) an aspheric mirror means for acquiring images of the objects in a desired area;

(b) refractive lens that relays electromagnetic rays reflected by (a) to the means of image acquisition as the final element of either an afocal or imaging optical assembly;

(c) means for image acquisition that transfers the electromagnetic energy of the continuous images formed by the optical assembly (a) and (b) onto an analog detector. A photographic film system may be used in lieu of an analog detector for the purpose of achieving the spatial resolution not available with the area arrays (e.g., for football games).

(d) means for maintaining the alignment of the means (a), (b) and (c) so that the electromagnetic waves reflected or acquired by (a) are properly conveyed by (b) to (c);

(e) a means for converting the analog detector's analog signal representations of the objects in (c) to digital format and transferring it to a storage device (e.g., video tape or disk, video display, memory buffer for subsequent processor, and being in specific applications, a standard video camera cassette or the Data Processing Electronics);

(f) a means for comparing the time-sequenced digital data from (e) to determine object attributes (e.g., presence, size, shape, intensity and location, etc.) and store in interim electronic or media storage;

(g) a learn mode means for scaling predicted traffic patterns to that of observed traffic patterns by deriving a transfer function that relates object space to image space by the correlation of preprogrammed, predicted traffic patterns to the traffic patterns derived from (f) above. This transfer function, when applied to the non-observable detection zones, boundaries, and/or areas that are defined in object space of predicted traffic, then defines the detection zones, boundaries, and/or areas in the image space. Object attributes of (f), which are within these detection boundaries are transferred to interim storage for subsequent processing or communication; and (h) a means for communicating the results from (g) to an interface unit for subsequent processing.

In the following general discussion of the various aspects of the invention, reference is made to subparagraphs lettered (a) to (h) for the elements listed in the preceding paragraph.

The mirror lens (a) may be any generic aspheric form with symmetry about an axis of rotation in which case the panoramic view of 360 degrees would be acquired. Alternatively, for special situations the mirror lens may be in another form, i.e., symmetric about an axis skewed or normal to the optic axis, e.g., a saddle, a trough or a pincushion, in which case the panoramic view would be less than 360 degrees. If the mirror lens (a) is mirror coated on the front (first) surface, it is preferably enclosed in an enclosure (d).

Figure 3:
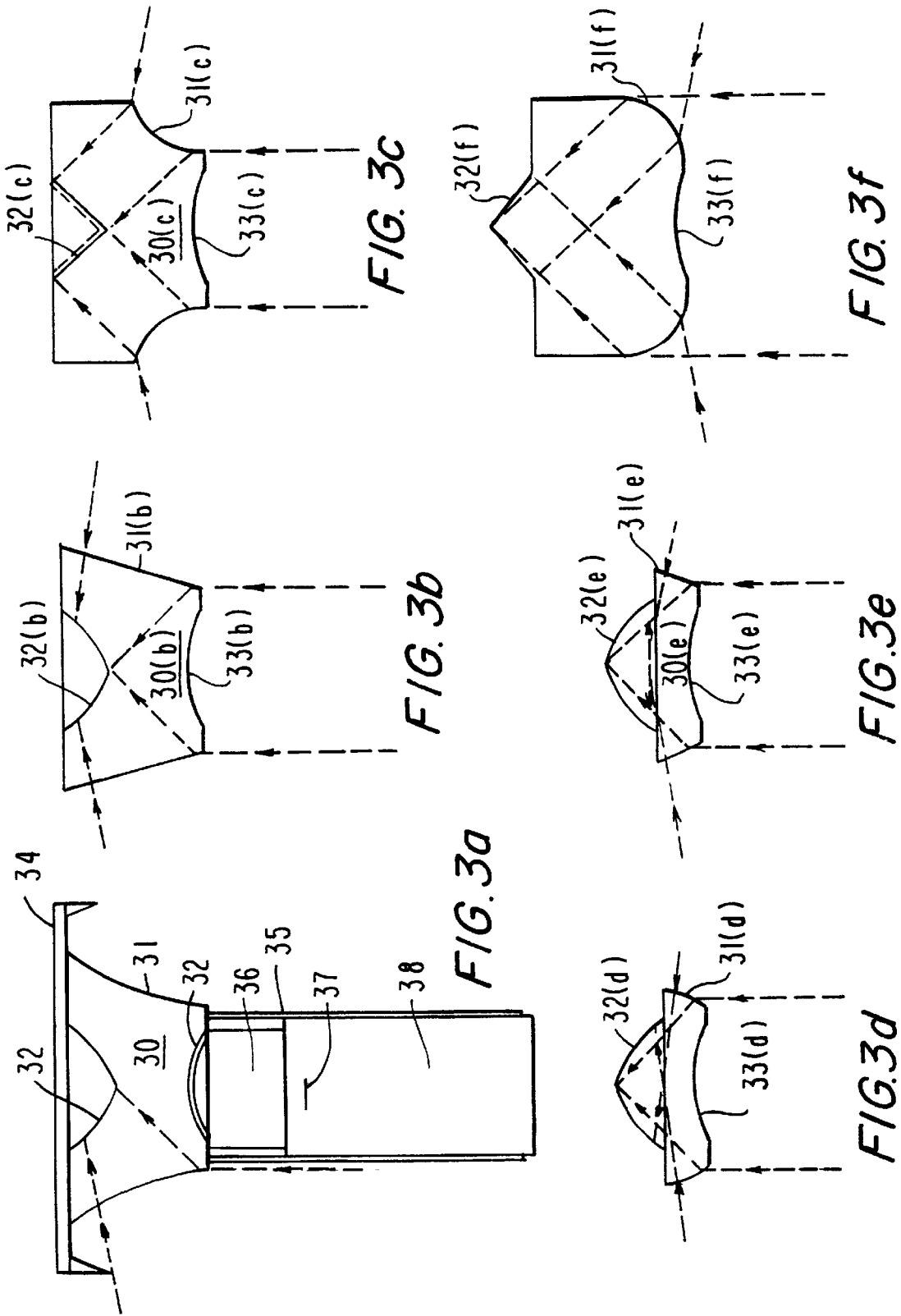
FIGS. 3(a)–(f) illustrate six variations of a particularly preferred lens assembly as the basis for the image acquisition and focusing means. All the variations of the solid catadioptric element have one rear mirror and two refractive surfaces that are used with a refractive lens assembly and need no separate enclosure.

An alternative and in some cases the most preferred mirror lens (a) is a solid catadioptric optic element with the mirror coated on the back (second) surface. When either version of mirror lens (a) is combined with refractive lens elements (b), it is possible to achieve acceptable distortion and image aberration for the desired surveillance application. In the solid catadioptric optic mirror lens, as illustrated in FIG. 3, the first and third (non-mirrored) refractive surfaces supplement and/or replace the function of refractive lens cell (b). In addition, those refractive surfaces may provide secondary field angle correction and primary aberration control of the wave front.

Figure 1:
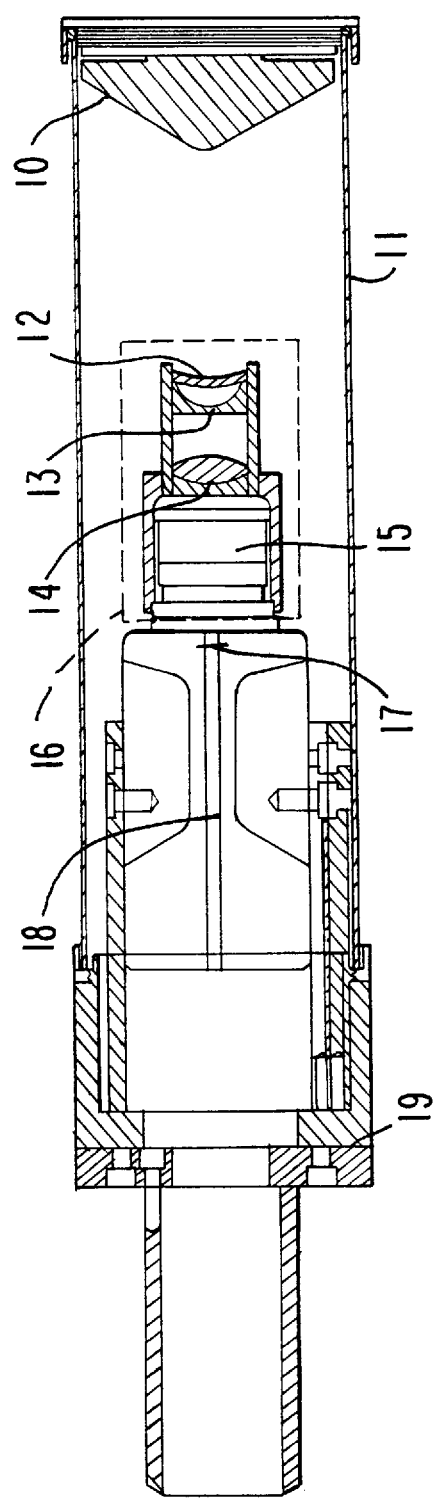
FIG. 1 illustrates one configuration of the front mirror design of the surveillance system of the invention with a convex mirror lens, a refractive lens assembly and a cylindrical quartz tube aligning and enclosing both optical elements as well as the video camera. This configuration acquired distortion free imagery, but with some central obscuration.
Figure 2:
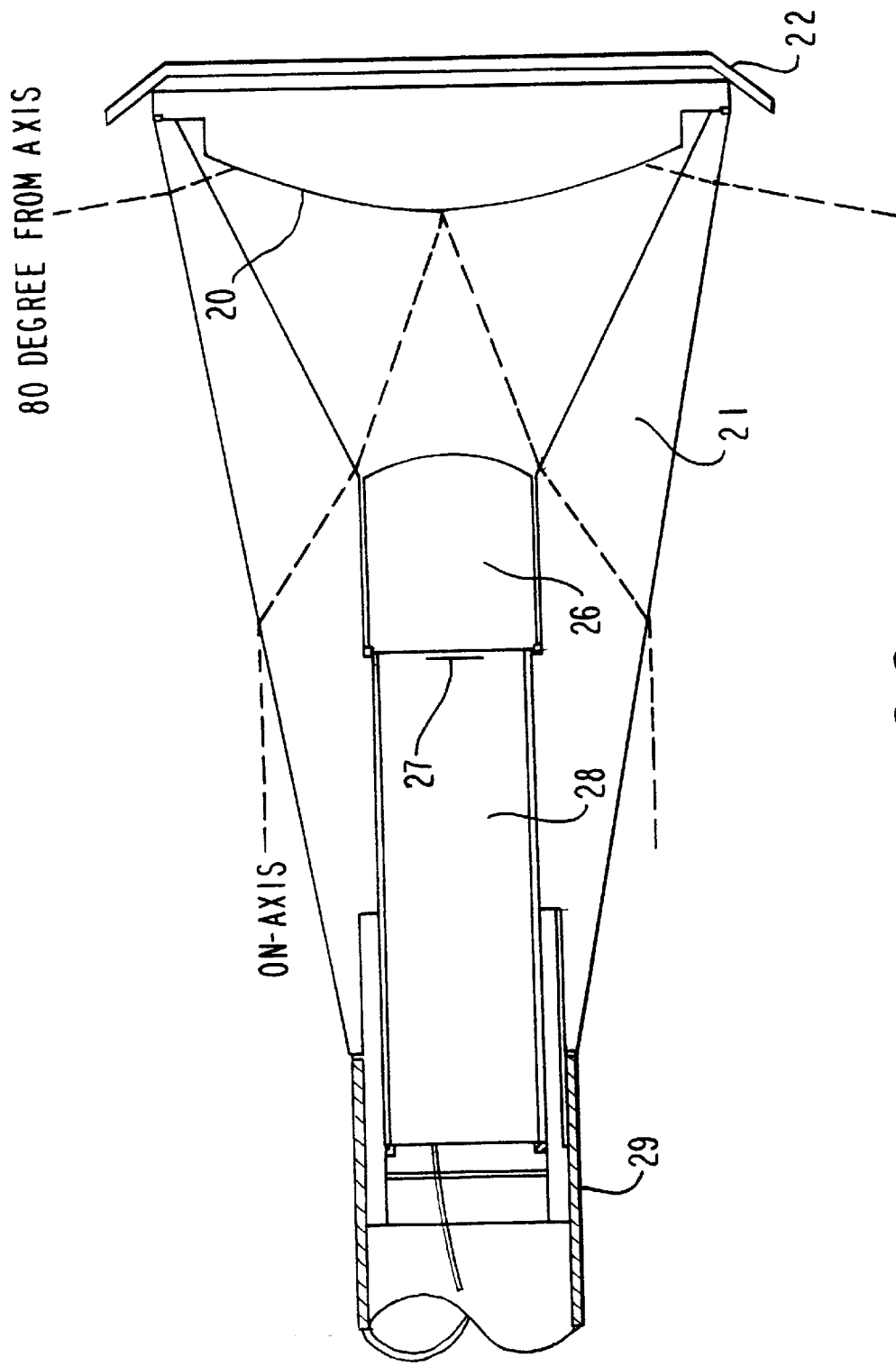
FIG. 2 illustrates another configuration of the front mirror design of the surveillance system. This configuration will provide distortion free imagery. Additionally, the optional wedge profile of the enclosure refracts the rays to acquire the entire object plane with minimal, if any, obscuration of the object plane.

A still or motion picture camera may be the means for image acquisition (c) that transfers the electromagnetic energy of the continuous images formed by the optical assembly (a) and (b) onto an electromagnetic energy sensitive photographic film. Such a system may be appropriate where the resolution of solid state detector arrays is inadequate or where the integrity of the acquired data requires film imagery. Generally preferred, however, is an analog detector that executes the electromagnetic energy transfer function at discrete time intervals over extended time periods. In one application, the information content of the desired area image is transferred via a detector array assembly (c), to a storage device (e). For other applications, a standard video camera may be used. In some applications, a camera with a monitor and no data recording device is useful. In yet another application, an area array camera with IR performance augmented with a visible area array camera may be chosen. In one preferred embodiment, the present invention relates to a single video camera (SVC) system, as illustrated in FIGS. 1, 2 and 3.

The means for maintaining the alignment (d) of the means (a), (b) and (c) so that the electromagnetic waves reflected or acquired by (a) are properly conveyed by (b) to (c) may also function as an environmental enclosure for the optical elements. Optionally this enclosure may protect the other elements of the surveillance system when the enclosure is extended beyond the optics and electronics or elements to be protected and then sealed. The enclosure may have a regular geometric shape that is symmetrical about an axis or a point and should be transparent to the electromagnetic spectrum of interest, i.e., result in no obscuration, and provide protection against the operational environment of the surveillance system of the invention. Examples of useful shapes are cylinders, globes and cones. One preferred configuration, for the front mirror design as illustrated in FIG. 2, uses a molded enclosure element with a "prism" shaped cross section to provide additional angular control (at the expense of some chromatic aberration) and thereby minimizes the central obscuration in the object plane. The replacement of the cylindrically shaped enclosure with a conically or hemispherically shaped enclosure can also mitigate reflected images of bright objects from the enclosure wall which is 180 degrees in azimuth from the real object. Such reflected or stray light images, usually having an intensity that is less than 4% of the primary image, were observed with the first two prototype designs. Preferably, enclosures of those shapes are thin-walled to minimize transmission losses and preferably optically coated, i.e., with magnesium fluoride. Such a coating may also be spectrally optimized for thermal control by the balance of absorption, reflection and transmission or by the controlled electrical conductivity for resistive heating. For other purposes, other antireflective, dielectric, electrically conductive, metallic, partially transmitting, polarizing and reflective coatings may be used.

When used as the primary curved mirror means (a), the solid catadioptric optical element itself provides a means for alignment and structural stability between the mirror, lens elements and image plane and therefore does not require a separate transparent enclosure (d). The surfaces of the solid catadioptric element may also be coated to optimize transmission, minimize secondary reflections and for thermal control.

The predicted traffic patterns may be defined by either site-specific data files or by a priori standard data files when unique site-specific data files are not required. The selection of an a priori standard file is determined by the absence of site files and the parameters of observed patterns derived from (f) above. As mentioned above and more fully described below, the learn mode feature (g) of the invention along with the unique wide field of view camera, eliminates the requirement for on-site alignment or on-site programming of the system and allows low-cost installation by unskilled technicians (by means of a learn mode routine). This learn mode routine optimizes the correlation, alignment and scaling between predicted traffic patterns of object space to observed patterns of image space. This transfer function is the means to transfer the known non-observable boundaries of emulated inductive loop detection zones into the image space of the detector array.

Thereafter means (h) pre-identifies and codes the location of each detection zone, by use of an algorithm, for compatibility to the reportable data relative to each zone. The systems of the invention have great flexibility in the kind and amount of data that can be detected per traffic zone of interest. For example, like the currently used inductive loop traffic sensors, the systems can determine the presence or absence of a vehicle. However, unlike the inductive loop traffic sensors, the systems of the invention can provide additional data on vehicle speed, total number of vehicles, and other data as explained hereafter. Whatever data is determined may be sent serially as a packet of data, or data word, per zone. Thirty-two of these data words may be transmitted at the update rate, defined by installation requirement, that is usually 5 times per second.

In the following discussion of specific embodiments of the invention, the numbers refer to items of the cited FIGS. Some of the comments in the discussion of FIG. 1 generally apply to the embodiment illustrated in FIGS. 2 and 3 as well.

FIG. 1 schematically shows in cross section one prototype of the invention where primary front surface mirror 10 is mounted at one end of a transparent cylindrical enclosure 11. This system demonstrated a distortionless (less than 0.5 percent of the full angle) linear field of view of an object plane nominally 10 meters from the mirror and normal to the optical axis. The design exhibited a central obscuration some ±10 degrees within the ±80 degrees of the optical axis for the full 360 degree panorama Refractive lens elements 12 (meniscus), 13 (plano-concave), 14 (achromatic), and commercial lens assembly 15 function together as one imaging system lens assembly 16 for a CCD detector array 17 at the focal plane. The assembly of the enclosure 11, front surfaced mirror 10, and the lens elements 12, 13, and 14 form an afocal system that may be integrated with any infinity focused video camera assembly to attain distortionless wide field of view acquisition. In the prototype, lens assembly 15 and CCD detector array 17 are the components of a commercial video camera system 18 (e.g., Ikegami Model ICD-4612). The commercial video camera 18 transfers the electromagnetic spectrum of the image at the focal plane as a video signal for the subsequent data processing electronics (not shown). In transparent cylindrical enclosure 11, the large volume taken up by the camera and the volume behind the camera can instead be used for a more compact camera array and the entire data processing electronics for the system of the invention. Video camera 18 can be chosen to optimize the detection of information content in the electromagnetic spectral band of interest, e.g., visual or near infrared. However, the whole optical assembly should be optimized for maximum reflection of the primary mirror 10 and maximum transmission by the refractive enclosure and lens elements 11–15. Base plate 19 seals the other end of the cylindrical enclosure 11 and can provide a common interface to the camera electronics and data processing electronics if the data processing electronics are external to the enclosure. Base plate 19 may also provide the structural support for the entire assembly and alignment functions between the entire assembly and the support structure, which may be any available support structure to enable the unit to be placed at the proper height and area of interest for surveillance.

Before sealing the enclosure 11, it is preferable to ensure that moisture inside the enclosure 11 is eliminated or minimized. Seals at each end of enclosure 11 may be made with a suitable adhesive used for optical assemblies, e.g., an epoxy resin.

FIG. 2 schematically shows in cross section another prototype of the invention where primary front surface mirror 20 is mounted at one end of a transparent molded enclosure 21. The refractive power in the cross section of this enclosure element 21 provides the additional field angle control to minimize the central obscuration of the object plane and internal stray light reflections while optimizing environmental and packaging considerations. In cylindrical enclosures, a brightly illuminated object will be partially reflected from the far side of the cylindrical wall 180 degrees in azimuth from the real object location. This reflection will enter the camera as an erroneous phantom image. Therefore, the conical configuration is preferred because it rejects the phantom images to outside the field of view of the camera. It should be noted that these reflections will not corrupt the performance of the system with cylindrical enclosures since the data processing electronics will reject images that do not enter or cross the detection zones in an acceptable direction and time sequence. However, this results in additional unnecessary processing overhead. As an additional precaution, light baffle and contamination shield 22 is provided. Refractive lens assembly 26 and the mirror 20 become an imaging system for a CCD detector array 27 at the focal plane of a custom video camera system 28. As in FIG. 1, the custom video camera 28 transfers the electromagnetic spectrum of the image at the focal plane as a video signal for the subsequent data processing electronics (not shown). Base plate 29 seals the other end of the enclosure 21 and can provide a common interface between the camera electronics and data processing electronics if the data processing electronics are external to the enclosure. In one configuration, base plate 29 may also provide the structural support for the entire assembly and alignment functions between the entire assembly and the support structure, which may be any available support structure to enable the unit to be placed at the proper height and area of interest for surveillance.

FIG. 3(a) illustrates in cross section one variation of a particularly preferred catadioptric lens element 30, which because it is a solid optical element supplies its own environmental protection for the mirror and the structural and alignment stability between optical surfaces. However, it may be desirable to affix a light baffle 34 to the top of the catadioptric element 30 in order to preclude direct solar impingement on the element and to prevent contamination from birds and insects. The catadioptric element 30 has three effective surfaces:

(1) The first surface 31 is the external optical surface (first surface seen by an observer of this system). This surface refracts the entering rays from distant objects onto back-surface coated mirror 32 by Snell's basic refraction equation of $n_1 \sin \theta_1 = n_2 \sin \theta_2$, where n is the media's index of refraction, $\theta$ is the ray angle relative to the instantaneous surface normal and the subscripts 1 and 2 indicate the media of the ray.

(2) The second surface 32 is a back surface-coated mirror and provides the primary control between radial distance in the focal plane and the linear scaling in orthogonal Cartesian coordinates of a flat object plane that is normal to the camera's optical axis, or the angular scaling in spherical coordinates relative to a point on the camera's optical axis. This surface redirects the rays between the first surface 31 and the third surface 33 using the basic reflection equations where the reflected and incident angles are of equal magnitude relative to the instantaneous surface normal.

(3) The third surface 33 is nominally normal to and centered on the optical axis and may be treated optically as an optical element of lens assembly 36.

Lens 36 is a refractive lens assembly which in concert with the catadioptric element 30 provides the field stop and the aberration and focus optimization to achieve the optical performance of the entire system as viewed by the CCD detector array 37 at the focal plane. The CCD detector array 37 is a component of a customized video camera system 38 that transfers the electromagnetic spectrum of the image at the focal plane as a video signal for the subsequent data processing electronics. As an enclosure for the electronics and refractive lens assembly 36, a cylindrical enclosure 35 is hermetically sealed to catadioptric lens element 30 to complete the environmental sealing of lens assembly 36 and detector array 37. Base plate 39 seals the other end of the cylindrical enclosure 35 and can provide a common interface between the camera electronics and data processing electronics if the data processing electronics are external to the enclosure. Base plate 39 may also provide the structural support for the entire assembly and alignment functions between the entire assembly and the support structure, which may be any available support structure to enable the unit to be placed at the proper height and area of interest for surveillance.

FIGS. 3(b–f) illustrate additional configurations of the solid three-surfaced catadioptric element. In these FIGS., the features are similar to those of FIG. 3(a) and are indicated by the same reference numerals with a suffix that is the same as the subfigure (b)–(f) to which they pertain.

Many combinations of surface geometry and prescriptions can achieve an acceptable distortionless, or known, relationship between object and image space within ±80 degrees from the optical axis for the full 360 degree panoramic field of view of the system of the invention. In the consideration and evaluation of practical designs, the optical properties of homogeneity, striae, transmission, dispersion, thermal stability, and image aberrations are considered along with the complexity of fabrication and testing.

In the preferred embodiment shown in FIG. 3(a), the observed central obscuration in the object space of the design illustrated in FIGS. 1 can be minimized, and in theory eliminated, to provide continuous imagery for a volume extending beyond an entire hemisphere. For traffic surveillance, this distortionless field of view is continuous for the entire 360 degrees in azimuth and for all points below 10 degrees from the horizon.

Figure 4:
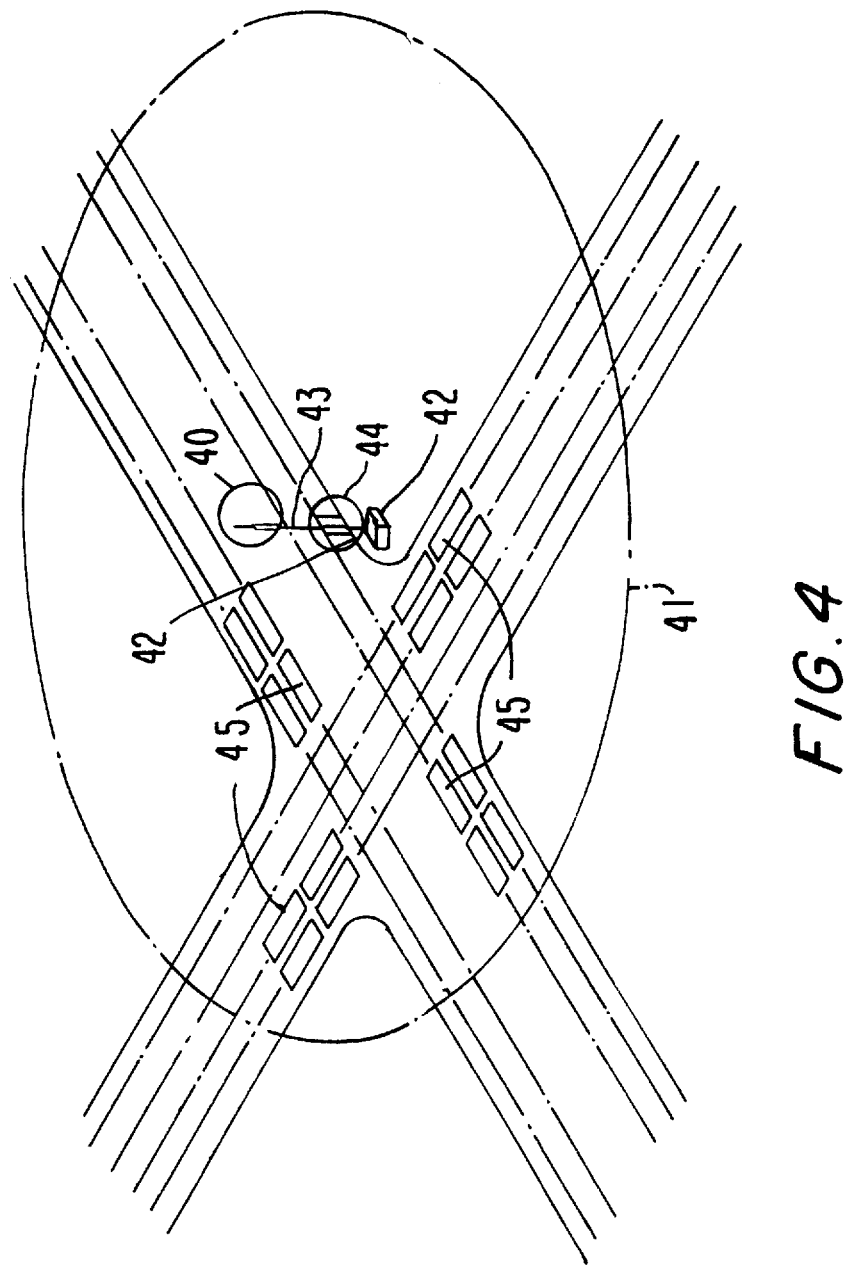
FIG. 4 illustrates the installation of the surveillance system of the invention at an intersection of vehicular traffic.

FIG. 4 illustrates the installation of a surveillance system 40 of the invention at an intersection of vehicular traffic indicated by 41. The shaded area and radii 42 represents the distortionless observation area of a single camera surveillance system 40. This radius 42 is nominally 5.6 times the installation height of the surveillance system 40. In the FIG. 4, the surveillance system 40 is shown mounted on a utility pole 43 already present at the intersection 41. In fact, this surveillance system normally will be installed on a structure that mounts or is close to the traffic controller 44. For convenience, all of the detection zones are indicated by one reference numeral 45. However, as shown, they comprise two zones for each of eight lanes approaching the intersection. The manner in which the lanes are detected, the detection zones defined and assigned unique identifiers with no critical alignments or post installation programming is discussed below, particularly in the subsection entitled, "Site Adaption Module" in the section "Data Processing Electronics."

As traffic controller electronics decrease in size, the controller will be incorporated into the data processing electronics as part of the system of the invention in order to avoid signal cabling and multiple power cabling to each traffic lamp at the traffic intersection 41. Preferably, the controller then multiplexes a low voltage address specific control signal on the power line to specifically control each specified lamp of the traffic signal at the intersection 41. This is accomplished by assigning a unique address to each lamp on the bus of the power line and then each lamp's own decoder will extract and execute the appropriate on/off commands. Within each traffic signal lamp housing, the electronics will recognize and execute its unique command for the individual lamp and will return an "ON" verify for each lamp drawing power. Separate logic in the SVC controller monitors each command signal and verify signal for proper response and for conflicts between prohibited combinations.

Figure 5:
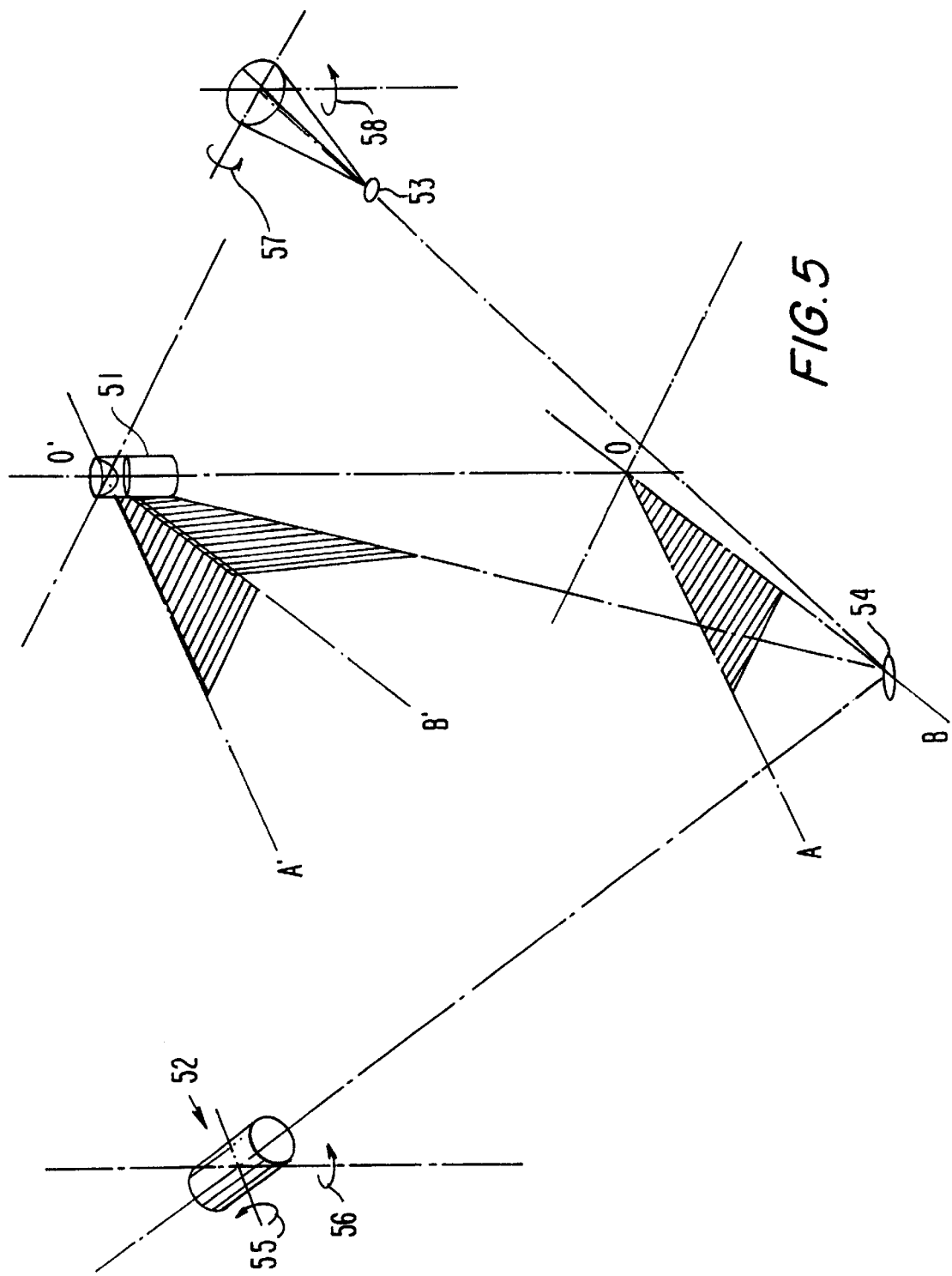
FIG. 5 illustrates the installation of an auxiliary acquisition systems pointing to the coordinate determined by the surveillance system of the invention.

FIG. 5 is an illustration of data acquisition systems, such as close-up fine resolution video cameras 52 or directional audio systems 53, that are aimed at the observed objects coordinates defined by the surveillance system 51 of this invention. The surveillance system of the invention 51 establishes a baseline image of the volume of interest and then provides to each auxiliary system 52, 53 the azimuthal 56, 58 and elevation angle 55, 57 of each object present in that volume relative to that baseline. A simple time sequence program may activate an alarm and/or recording from these systems when an object, or an improper number of objects, are present in, or specific detection areas within, this volume. Naturally, an external command or alarm may also activate the simultaneous data acquisition of objects at the coordinate defined by the system of this invention.

Figure 6:
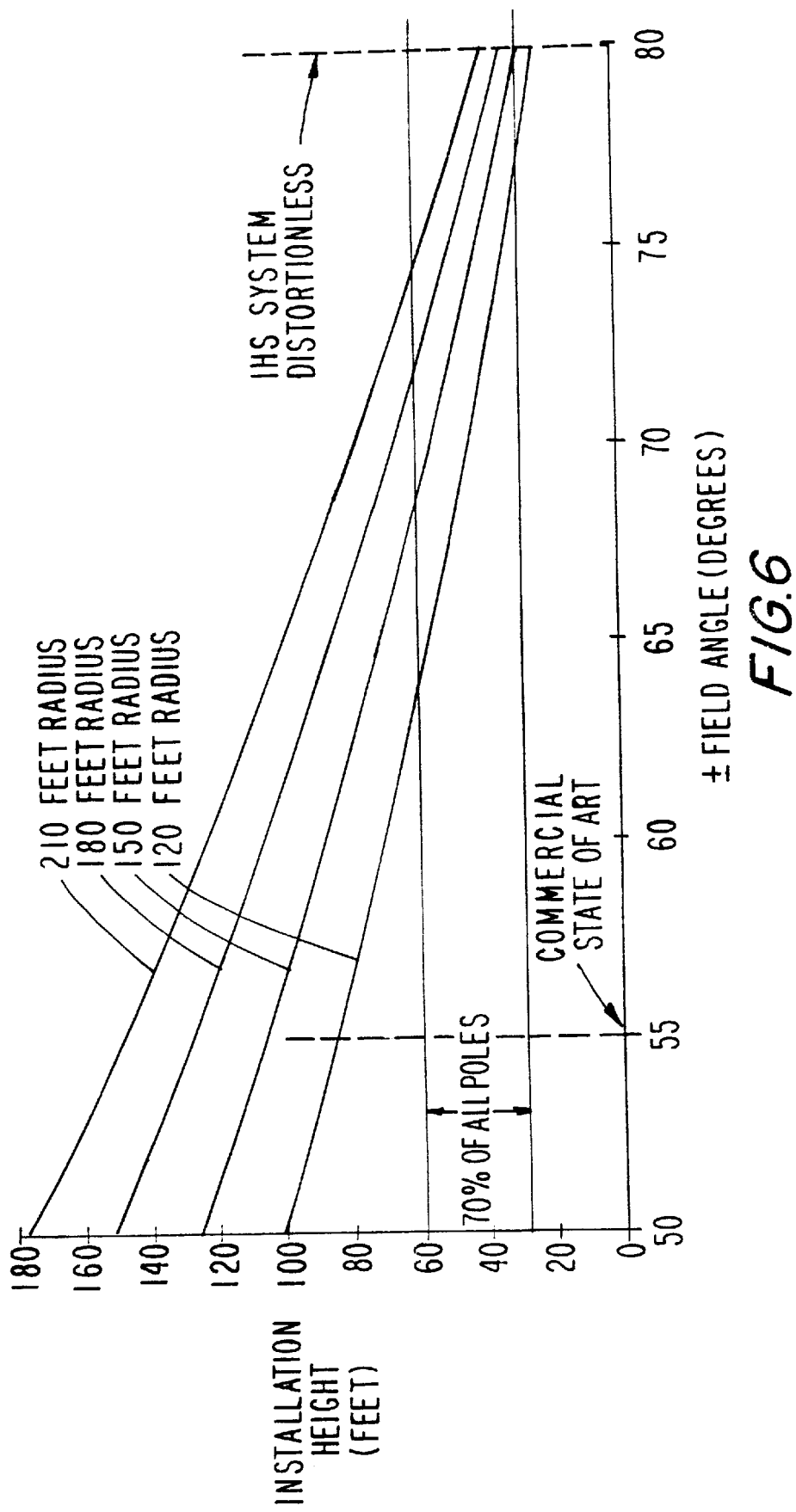
FIG. 6 is a graph of a surveillance system's required installation height as a function of field angle for discrete observation radii. This graph also indicates a statistical height estimate of all roadside utility and luminary structures.

FIG. 6 is a graph of the required surveillance system installation height as a function of field angle for discrete observation radii. This graph shows that the present state-of-the-art traffic surveillance systems which have less than a ±55 degree field of view cannot achieve a minimum surveillance area of 180 feet when they are mounted on the nominally available structures along U.S., New York State, and local Department of Transportation (DOT) roadways. The statistical estimate of all roadside utility and luminary structures height that are common to DOT roadways is labelled in the field of the graph.

Figure 7:
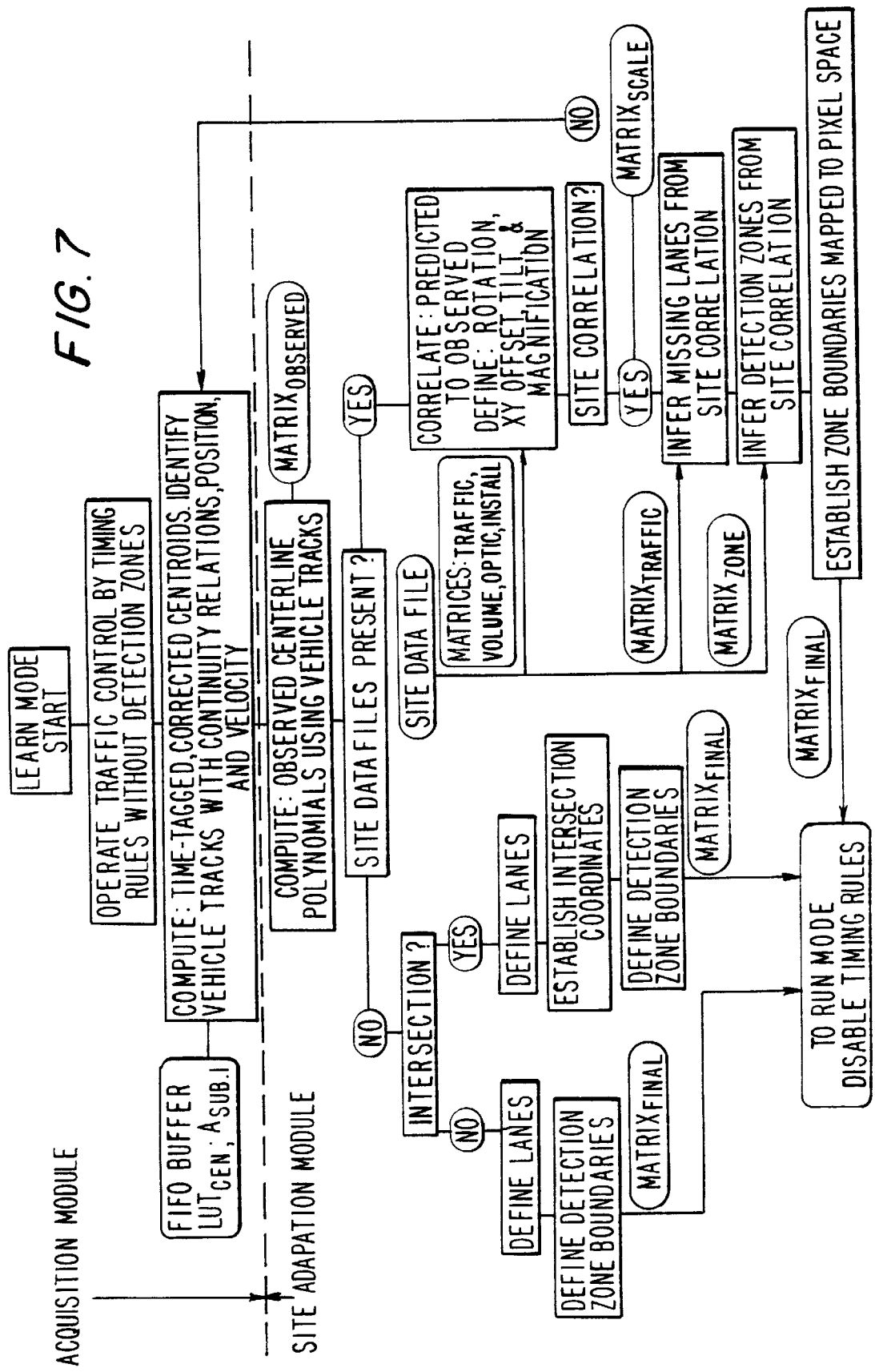
FIG. 7 is a block diagram of the data processing electronics logic for learn mode modules.

FIG. 7 is a logic flow diagram for the adaptive software, herein referred to as the "learn" mode, that will provide the transfer or scaling function between the predicted traffic in real space and the observed traffic in the pixel (image) space of the detector array. This scaling is then used to transfer the detection zones (also defined in the real space of the predicted traffic) into the image space (of the observed traffic). Each of the logic blocks of this flow diagram has been verified with simulated data. The logic blocks will be refined and implemented in firmware. A detailed discussion of the logic blocks of FIG. 7 is given in the subsection "Site Adaptation Module" of the "Data Processing Electronics" section below.

Figure 8:
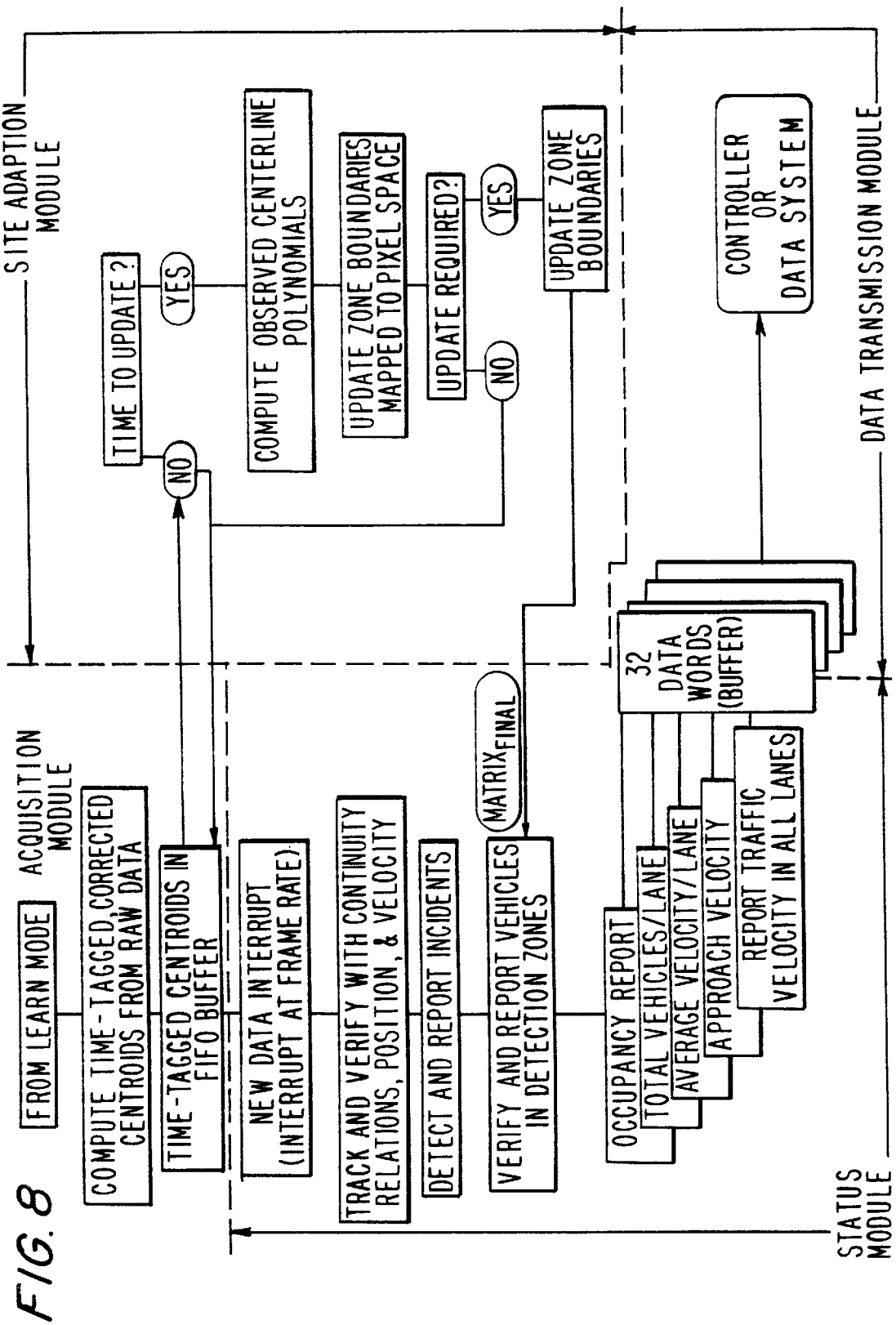
FIG. 8 is a block diagram of the data processing electronics logic for run mode modules.

FIG. 8 is an overview of the logic for the zone status module in the data processing electronics. This module transfers the image information of camera electronics into the interface signals for the controller and contains such data as number of vehicles present in each detection zone, each lane and in the entire intersection, the average velocity in each lane, the average approach velocity, incident detection and limited vehicle classification. A detailed discussion of the logic blocks of FIG. 8 is given in the subsection "Zone Status Module" of the "Data Processing Electronics" section below.

For the specific traffic surveillance application, the SVC system requires no programming or fine alignment after mounting. This feat is accomplished by the novel optimization of the scaling, or transfer function, between predicted traffic patterns of a known coordinate system in object space (from engineering drawings) and observed traffic patterns on the detector array. The application then uses that derived scaling to define the detection zones, which are non-observable and specified in the known coordinates of the predicted traffic, in the domain of the detector array. The implementation of this feature is identified herein as part of the learn mode and is uniquely useable in this system since the wide field of view optics can simultaneously observe intersecting traffic patterns that uniquely define correlating points between the predicted and observed patterns. Hence, this logic adapts each SVC system to specific applications through one of two learn modes after the system is mounted.

The first learn mode, as shown in FIG. 7, is for the condition where the DPE had been preprogrammed with a "Site Data File", which is a matrix array from a look-up-table (LUT). This LUT defines the exact location of the predicted traffic centerline for each lane and the boundaries of each detection zone in the same dimensional units that are used to define the scaling relationship between real (object) and image (detector) space. This learn mode will continuously update the optics scaling and alignment for optimum correlation between the predicted traffic pattern of the site file and statistically observed traffic patterns in the image (focal) plane. This learn mode routine then defines the final scaling by the iterative correlation between the predicted patterns relative to the observed patterns. This scaling is then used to relate the non-observable detection zone's acceptance limits (boundaries) into the dimensional space of the detector array. With that accomplished, the traffic information relative to each object is then tagged with the appropriate detection zone's identifier when the object's corrected centroid is bounded within the acceptance limits of a given zone.

The second learn mode is one in which "Site Data Files" are not required because the application is considered to be a standard. Standard applications are those where the SVC is used to monitor traffic in parallel lanes with no intersection or where an intersection only has "orthogonal straight through" lanes with no lanes for "turning or parking" and where the traffic density is nearly equal in all parallel lanes. In this second learn mode, where there are no site data files, the detection zone boundaries are defined by the statistical relationship between lane widths and the location relative to the intersection of traffic lanes at an intersection.

In addition to the learn modes, the DPE applies a novel logic convention to standardize the sequential identification of each traffic detection zone of the intersection or to correlate the data when more than one video system (from multiple locations or for multiple electromagnetic spectrums) is used for one intersection.

These unique functions may be executed in near real time from live "video" data in a special processor within the SVC or, as implemented by the prototype units, on a specially prepared personal computer. A standard PC with adapter cards suffices when processing time is not critical and the raw data had been recorded on video tape or electromagnetic memory devise, captured by the circuitry of a computer, and stored on a computer interface of tape, hard disk, diskette or chip memory.

UNIQUE EXTREMELY WIDE FIELD OF VIEW OPTICAL SYSTEM

The SVC optical system may use either of two basic design solutions. Both solutions provide a mirrored surface and matched optics to achieve an acceptable fixed scaling for the non-obscured 360 degree panoramic surveillance of the desired field of view, image resolution, and image aberration control.

The first solution's unique features (as shown in FIGS. 1 and 2) are:

1. A matched mirror and field lens assembly that are housed by the enclosure to create an afocal optical system where both object and image planes are at infinity or an imaging optical system for a detection system.
2. The environmental enclosure (optical window) that also provides structural stability between the elements and the system with no obscuration.

The unique features of the second embodiment (as shown in FIG. 3) include:

1. A three optical surface catadioptric element with axial symmetry and a mirror between the first and third surfaces. The external surface of the system exploits Snell's law to mitigate the central obscuration of a system that "looks behind itself".
2. The three surfaces are matched with the field lens assembly to create an afocal or imaging optical system.
3. In concept, the optical system could provide some degree of surveillance exceeding two thirds of an entire sphere with no object space obscuration.

The catadioptric optical systems of this invention have an unobstructed simultaneous 360 degree field of view in azimuth and may have more than 90 degrees in elevation that is unobstructed as shown in FIGS. 1, 2 and 3. The first fabricated optical design was configured with a parabolic primary mirror. For other designs, the reflective surface may be in the form of a spheroid, ellipsoid, hyperboloid, paraboloid or aspheric with a unique surface prescription to achieve a desired scaling function between object and image space. Considering the paraboloid of the first design, all rays directed toward the virtual on-axis focal point of a paraboloid entered the camera's field lens assembly as rays parallel to the optical axis. In such a configuration the radius of the ray entering the field lens is a function of elevation angle of the ray reflected by the primary mirror and has a field angle ($\alpha$) defined by $$\alpha = 2 \arctan (Y/2P), \quad\quad \text{Eq. 1.)}$$

where Y (zero to 25.6 millimeters) equals the radius on the mirror's surface from optical axis and P (12.5 millimeters) equals the parabola's directrix. When the focal plane has a 256×256 pixel array scaled to the primary mirror aperture, the field angle along the axis of the detector plane is then defined as $$\alpha = 2 \arctan (0.008 \text{ pixels}). \quad\quad \text{Eq. 2.)}$$

For the paraboloid, a simple plano-convex lens, aligned one focal length from the commercial camera's pupil and aligned to focus on the paraboloid's focal surface, imaged the system's field of view onto the camera detector surface.

The design and fabrication requirements for this optical system are very tolerant of significant departures from ideal prescriptions and alignment between conjugate focal surfaces of the refractive and reflective elements. For instance, the optimum optical design for this system would resolve less than 5 square centimeters. The average pixel, in the camera's area of interest, will resolve about 500 square centimeters. A stationary motorcycle exceeds 5,000 square centimeters and a frame-to-frame image shift of a car traveling at 15 miles per hour is more than 10,000 square centimeters at a video scan rate of ten frames per seconds.

A unique aspect of the embodiment of this optical system illustrated in FIGS. 1 and 2 is the clear, thin wall, cylindrical window 11 and 21 which provides the structural support and alignment stability between the reflective convex mirror 10 and the refractive lens group 16 with no loss of viewing area or optical performance. It may be desirable to apply optical coatings to the enclosure's surfaces in order to minimize or prevent adverse reflections. When this unique optical cylinder 11 is extended beyond the electronics of the camera system 18 and then sealed on both ends, it provides the hermetic environmental enclosure for the entire camera system as shown in FIGS. 1 and 2. The comments relative to FIG. 1 generally apply to the embodiment illustrated in FIG. 2 as well.

In FIG. 2, the commercial glass tubing enclosure used for the first designs as shown in FIG. 1 is replaced with a molded axial symmetric enclosure that provides the additional angular control in elevation to minimize the central obscuration of the object plane's image on the detector.

Within the constraint that the total field of view must be maintained, the system can be optimized for linearity (radial distortion) between object and image space and image quality. For this catadioptric design, linearity is dominated by the surface prescription of the primary mirror and image quality is then optimized by means of a proper field lens prescription. It should be noted that the optimum image quality for a traffic detection system requires low resolution imagery that emulates an image filter which reduces the high frequency spatial content that is within the image of interest, and simplifies the identification of a single large object. Diffraction limited systems observe the details of hood ornaments, side view mirrors, grill, trim, and even content viewed through the vehicle windows and these appear as multiple images which must be electronically filtered.

A primary mirror that provides a distortion free viewing for spherical coordinates is provided by defining the included angle ($\alpha$) between the incident and reflected rays as $$\alpha = kY, \quad \text{Eq. 3.)}$$

where the constant (k) is the scaling factor between the maximum optic radius (Y) and the maximum included angle. The instantaneous slope, with Z being the optical axis of symmetry, as a function of Y is then defined as $$\frac{\delta Z}{\delta Y} = \tan(0.5\alpha) = \tan(0.5kY) \quad \text{Eq. 4.)}$$

and then the surface is defined by the integral $$Z = \int \tan(0.5kY)\delta Y \quad \text{Eq. 5.)}$$

A primary mirror, that reflects a full hemisphere (excluding the central obscuration of the camera itself) in a system with a 256×256 pixel array across the mirror's aperture, then has a closed form solution to define the surface (Z) as $$Z = \frac{4}{\pi}(-\ln(\cos(0.002 \times \pi \times \text{Pixel}))) \quad \text{Eq. 6.)}$$

Here again, the trade off between image quality and linear scaling of the field angle may modify this prescription. However, for traffic surveillance, a linear scaling of the 110×110 meter ground area from an elevation (h) of 10,000 mm relative to a 256×256 pixel array is required. This invention describes such a mirror element as a form that satisfies the fixed relationship of ground space to image space. This relationship is established when the ground space is equal to (K)(Y) and defining the included angle ($\alpha$) of the incident and reflected ray as for a convex mirror as:

$$\alpha = \arctan\left(Y\frac{k-1}{h}\right) \quad \text{Eq. 7.)}$$

Then the instantaneous slope on the primary mirror is $$\frac{\delta Z}{\delta Y} = \tan\left(0.5\arctan\left(Y\frac{k-1}{h}\right)\right) \quad \text{Eq. 8.)}$$

and the primary mirror surface then has the form $$Z = \int_0^Y \tan\left(0.5\arctan\left(Y\frac{k-1}{h}\right)\right)\delta Y \quad \text{Eq. 9.)}$$

where Z is the mirror axial distance from its vertex.

Maintaining the above primary mirror to pixel scaling on the detector plane and 2201 mm on ground per unit measure on the mirror, yields a fixed scaling of 440 mm per pixel for the entire 110×110 (370×370 feet) area of interest.

Based on Eq. 9, that a distortionless linear relationship between ground level object space to image space is feasible, the design trade off between zero distortion and image quality derived a prescription of Table 1 and the hardware of FIG. 1. This system demonstrated, as predicted by the output of the ray trace program shown in Table 2, a linear relationship within 0.4 meters over a ±55 meter (±180 feet) field of view of an object plane 10 meters below and normal to the optical system. Exceptional imagery was also acquired at lower and significantly higher elevations.

The principles of the above discussion apply to the designs as shown in FIGS. 2 and 3. However in FIG. 3 the field angle is the included angle formed by the mirror relative to the axis of symmetry, modified by the refractive angle for the mirror ray's incident angle at the interface of the external surface of the system. Hence the second design solution provides the unique feature and solution to ameliorate the central obscuration present in the first two fabricated designs. In addition, the basic design of a solid three surface catadioptric element within the system is significantly more compact and does not require the transparent environmental enclosure. A refined version of this design as illustrated by FIG. 3 is the preferred optical configuration for the future traffic surveillance system.

UNIQUE ENVIRONMENTAL ENCLOSURE FOR AN OPTICAL SYSTEM

A unique aspect of the first basic design solution, as shown in FIG. 1, is the environmental enclosure that also provides the structural support and alignment stability between the mirror, the refractive lens group, and camera electronics with no loss of viewing area or optical resolution. When this cylindrical configuration is extended beyond the electronics of the camera system and then sealed on both ends, it provides the hermetic environmental enclosure for the entire camera system.

Three generic conditions that do not alter the direction of the output ray relative to an input rWay as it passes through a homogeneous optical element occur:

1. When the "optic index" of the optical element and the input and output media are identical;
2. When the optical element has parallel surfaces, (as in this case):
3. When the input ray and output ray are in a plane normal to the interface surfaces, (also, as in this case).

As a result, the direction vector will remain unchanged for any radial ray that is in an azimuthal plane normal to and passes through the two concentric surfaces of a thin wall conical element or a cylinder. Therefore, these elements are ideal enclosures for an extremely wide field of view system. For the specific application to demonstrate the feasibility of a surveillance system, an off-the-shelf cylinder is preferred for the optimum optical quality per unit cost and the ease of applying antireflective coatings, assembling into an optical system, and sealing the enclosure as a "hermetic" assembly. However, enclosures that are spherical or conical as shown in FIG. 2 may also be used. The conical configuration is preferred when the product of object intensity and the reflection from the enclosure wall, that is at an azimuthal angle 180 degrees from the real object, exceed the intensity threshold of the DPE. We should note that these reflections will not corrupt the performance since they do not enter or cross the detection zones in an acceptable time sequence.

DATA PROCESSING ELECTRONICS (DPE)

The primary features relating to the DPE are the concepts and techniques that 1. eliminate programming and fine alignment after field installation;
2. automate compensation for misalignments and scaling;
3. automate boundary definition of detection zones; and
4. encode object data per detection zone to standard word (data packet) format for minimum bandwidth transmission to a traffic controller or information processor interface.

The information from each DPE's detection zone emulates all functions of the commonly used, road-embedded, inductive control loops and associated electronics. In addition, the DPE also will provide information such as velocity of each object, average object velocity during a time window prior to the traffic control light changing from green to yellow or red, number of objects present in queue, number of objects that have passed, incident detection and object classification.

In addition, the object height may be established by the change in image length and width as a function of change in field angle, thereby making possible the reconstruction of a 3D image for object classification. The reconstruction algorithms benefit from the system's extremely wide field of view, the negligible distortion and the capability to view an object as it approaches (to acquire height information of the rear surface), as it passes through the point closest to the SVC (to acquire the true length) and as it departs (to acquire height information of the front surface).

The description of the DPE has been divided into four modules;

I Data acquisition and traffic detection;

II Site adaptation (pixel array definition for each detection zone);

III Zone status; and

IV Data transmission.

I Data Acquisition and Traffic Module

The DPE front end electronics module acquires the data from the image detector (camera array) and then processes that data to detect all objects of proper size and relative intensity. The centroid of each detected object that has been accepted is corrected and then, along with a time tag and salient features, such as size and intensity, will be entered into a look up table called $LUT_{Cen}$ as an array and is referred to as sub array $A_{Sub,i}$. FIG. 7 is a functional flow of the logic used by this system.

The corrected centroids are standard mathematical centroids of an image, but they are expressed for an object that is nominally the height of a standard vehicle. The departure of an object's height from that of a standard height projects a shift in width and length in a known direction as a function of field position. Thus when an object appears wider than a standard width (which is specified as a function of field position) the centroid is compensated to the height of the standard, and the data file for that image is updated with the object height for subsequent processing. Likewise, the software for this system does not require corrections for unique systematic bias offsets that are common to all images of a given height, i.e., sun shadows. The learn mode accommodates systematic centroid shifts by shifting the detection some to retain optimum alignment. This process is discussed below.

The image detector's configuration, geometry, spectral performance along with the techniques and electronics that transfer the image data into a data array of values in a temporary buffer are known to those familiar with the art. Likewise, the technique, logic and algorithms to detect and locate specific objects in a continuous scene: including differencing of successive scenes, differencing of a scene from an average (background) scene, several edge detection schemes and the combination of the above, are also commonly known to those familiar with the art.

II Site Adaptation Module

The site adaptation module establishes the image space location, boundaries and encoded designators that emulate the ideal road-embedded inductive loop (detection zones) for each lane. The synergism of this logic with a wide field of view camera is unique, new, and novel to this industry. The combined effect is that the predicted and observed equations and coordinates of traffic lanes, and the lane intersections, are correlated to precisely define the transfer function between the predicted coordinates (computed from engineering drawing definition of traffic lane centerlines and the theoretical scaling between drawing coordinates and pixel coordinates of the image plane) and observed coordinates (in pixel space of the image plane).

The logic for the unique designator assigned to each detection zone is based upon the a priori knowledge that the camera's azimuthal orientation nominally aligned the detector array with the primary flow of traffic. Thus, the two detection zones in the lane that are closest to and nearly parallel with the camera's primary axis are established to be at the position of 12 o'clock and are assigned the values of 1 and 17. One is the zone closest to the intersection. Then detection zones are sequentially numbered in a clockwise direction as viewed from above with 1 through 16 as the inner zones and 17 through 32 as the outer zones. The initial sizing for 32 detection zones assumes 2 zones per lane. Ninety-five percent of all traffic controlled intersections have no more than 16 approach lanes. When the intersection requirements conflict with the above zone identification logic, for example, where there are fewer or more than two zones per lane, then the programmed site files take precedence and can place and encode these zones at the programmer's discretion.

The SVC system requires no programming or fine alignment after mounting. The DPE accommodates the misalignment by a unique learn mode algorithm that adapts each SVC system to the uniqueness of the specific intersection through an adaptive sequence after the system is mounted. In general, as shown in FIG. 7 there are two learn modes within each SVC. One is for the condition where the DPE had been preprogrammed with a "Site File" to define the exact location of each lane's centerline and each detection zone in the same dimensional units that are used to define the scaling relationship between object (engineering site drawings) and image space. The second learn mode is when "Site Files" are not required because the application is considered to be a standard. Standard applications are those where the SVC is used to monitor traffic in parallel lanes with no intersection or where the an intersection only has "orthogonal straight through" lanes with no lanes for "turning or parking" and where the traffic density is nearly equal in all parallel lanes.

LEARN MODE WITH "SITE FILES"

If a "site file" is present, the learn mode will continuously update the optics scaling (object to image space) to maintain the optimum correlation between the predicted traffic patterns (from engineering site drawings) and the statistically observed traffic patterns (on the detector array). The final scaling algorithms, that optimize the predicted to observed traffic patterns, are then used to relate the predicted traffic detection zone's acceptance limits (boundaries defined from above engineering site drawings) into the same dimensional space of the detector array. With that accomplished, the traffic information relative to each object is then tagged with the appropriate detection zone's identifier when the object's corrected centroid is bounded within the acceptance limits of a given zone.

The innovative zone detection is feasible by the synergism of the following:

1. Each installation has an accurate topographic drawing of the installation site and traffic estimates of each lane. These drawings define the precise location of: the SVC itself, the traffic lanes, the traffic controller, the location and size of each traffic detection zone plus the traffic controller's preassigned designation for each traffic detection zone. In addition, the drawings reflect the true centerline of the average traffic in each lane. Finally a scaled orthogonal grid is applied to these drawings such that the primary axis is aligned parallel to the primary axis of the video camera. From these drawings, the centerline of the average traffic in each lane is defined by a mathematical function, such as the polynomial $$Y = M_i X + N_i X^2 + C_i \qquad \text{Eq. 10.)}$$

and where the constants ($M_i$, $N_i$, and $C_i$) for each lane are summarized by $matrix_{traffic}$. The expected volume of traffic along each lane is summarized in $matrix_{volume}$.

2. Likewise, the above engineering drawings and coordinate system define the minimum and maximum boundaries for each detection zone by a similar set of constants defined in $matrix_{zone}$.

3. The geometric prescription for the optical system and for the camera's detector is precisely known so that a scaling function between real (true object size) to pixel (image size) space can be established and defined in scaling $matrix_{optic}$. The inverse of this matrix is used to relate pixel space to real space.

4. The precise effect to the SVC scaling equations in $matrix_{optic}$ as a function of systematic errors (in installation height, misplacement from the assumed location, alignment relative to gravity, and rotation about the optical axis) is known and fully quantified by a set of sensitivity equations that are identified by $matrix_{install}$. The amplitudes for each of these sensitivities are defined in a matrix identified as $matrix_{weight}$ and for the initial installation the effect of $matrix_{install}$ and $matrix_{weigh}$ is set to unity (1).

5. The observed corrected centroids $A_{Sub,i}$ listed in the lookup table $LUT_{Cen}$, as described in the above data acquisition and traffic detection section, are sorted and functions (i.e., polynomial curves) are fitted by an iterative estimator that will reject lower probability points until each curve has a confidence exceeding some threshold (i.e., an R Squared ($R^2$) exceeding 0.98). The constants ($A_1$, $B_1$, and $C_1$) of the best fit curve now describe the observed centerline of each "heavily traveled" lane as $$Pixel^{No.}{}_{Column} = A_1(Pixel^{No.}{}_{Row}) + B_1(Pixel^{No.}{}_{Row})^2 + C_1 \qquad \text{Eq. 11.)}$$

and these constants for each lane are defined by $matrix_{observed}$. The DPE may use the weighing factor of $matrix_{volume}$ to correlate the observed centroids per traffic lane with the predicted volume when there are too few centroids to identify each lane with proper confidence.

6. The DPE "Learn Mode" algorithm continuously updates the adjust $matrix_{weight}$ until the predicted traffic centerlines, based on a function of {$matrix_{traffic}$, $matrix_{optic}$, $matrix_{install}$, and $matrix_{weight}$} are forced to equal the observed centerlines defined by $matrix_{observed}$. At that time, the functional effect of {$matrix_{optic}$, $matrix_{install}$, and $matrix_{weight}$} equals the precise scaling between real space and image space and is represented by an equivalent matrix of equations called $matrix_{scale}$. The equations in $matrix_{scale}$ are continuously updated and the inverse of the matrix is the precise scaling from image space to real space. At that point, the detection zones of $matrix_{zone}$ are redefined by $matrix_{scale}$ to establish a new $matrix_{final}$ that summarizes the minimum and maximum boundaries of each detection zone in the pixel (image) space. This adaptive loop also accommodates the repositioning and slow alignment drifts that, as an example, may be due to thermal bending of the pole upon which the SVC is mounted or the change in shadow from the sun or a function of time. The above logic does not preclude the use of fixed scenes correlation in consecutive data, to maintain object space to image space alignment.

The inverse of the object to image space scaling is also used to report object data in the real (true object size) space of the site drawings. By this technique, multiple SVC systems are spatially aligned and become synergistic when they operate at different bands of the electromagnetic spectrum (e.g., visible and infrared) or from different locations to preclude missed detection by the occultation of a nearer object, or for real time three dimensional reconstruction for classification, or when two or more intersection share common detection zones and the intersections are synchronized.

LEARN MODE WITH NO "SITE FILES"

If a "site file" is not present, then the site adaptation module will define the detection zones from the observed data and the synergism of the following facts. The functional block diagram for the learn mode is shown in FIG. 7.

1. The geometric prescriptions for the optical system and for the camera's detector are precisely known so that a scaling function between real to pixel space can be established and defined in scaling $matrix_{optic}$. The inverse of this matrix is used to relate real space to pixel space.

2. The SVC scaling equations in $matrix_{optic}$ are applied as $matrix_{scale}$ for installations with no site files, i.e., the effect of $matrix_{install}$ and $matrix_{weigh}$ is set to unity (1).

3. The observed corrected centroids $A_{Sub,i}$ listed in the lookup table $LUT_{Cen}$, as described in above data acquisition and traffic detection section, are sorted and functions (e.g., polynomial curves) are fitted by an iterative estimator that will reject lower probability points until each curve has an R Squared ($R^2$) confidence exceeding some threshold (i.e., 0.98). The constants ($A_1$, $B_1$, and $C_1$) of the best fit curve now describe $$Pixel^{No.}{}_{Column} = A_1(Pixel^{No.}{}_{Row}) + B_1(Pixel^{No.}{}_{Row})^2 + C_1 \qquad \text{Eq. 12.)}$$

The observed centerline of each "heavily traveled" lane and are defined by $matrix_{observed}$.

4. After $matrix_{observed}$ has been established, the DPE will establish one of two configurations for subsequent data processing. The two configurations are "traffic intersection" and "open roadway" and the choice is determined by the difference between the maximum and minimum slopes of the constants in $matrix_{observed}$. When this difference is greater than 0.5, a traffic intersection is assumed to be present in the system's field of view.

(i) Traffic intersection

The traffic intersection configuration is assumed when the maximum slope less the minimum slope of the constants in matrix$_{observed}$ exceeds k$_m$ (i.e., >0.5). For this condition, the following learn mode routines are initiated to define the four boundary conditions for each zone in matrix$_{final}$. The boundaries along the length of each lane are defined relative to the intercept coordinates of the orthogonal lane centerlines as determined by simultaneous equations (matrix application) of the constants of matrix$_{observed}$. The first intercept coordinate along the direction of traffic (closest to the maximum of centroids per unit lane length due to static objects in queue for red light) is established as a detection zone's reference for each lane. The scaling matrix$_{optic}$ (being the same as matrix$_{scale}$) is used to define 12 meter (~40 foot) separations between the two boundaries of each detection zone starting at the above detection zone reference. The two boundaries parallel to the lanes of traffic are then computed.

The processing logic then defines the width of all adjacent lanes as the difference between the two adjacent traffic centerlines in matrix$_{observed}$ without regard for the direction of travel. Likewise, the imaginary lines that define each detection zone's boundary between two lanes are defined in matrix$_{final}$ as the average of adjacent lane traffic centerlines defined by matrix$_{observed}$. The detection zone's curb boundary is also defined in matrix$_{final}$ for each lane as the centerline, defined by matrix$_{observed}$, plus (or minus) one half of the lane width as computed above.

(ii) Open roadway

This configuration is assumed when the maximum slope less the minimum slope of the constants in matrix$_{observed}$ does not exceed k$_m$ (i.e., <0.5). The four boundary conditions for each zone are defined in matrix$_{final}$. The boundary width of each detection zone is defined by the edge of each lane discussed above. The minimum and maximum boundaries along the lane's length are established by a curve normal to each lane's traffic centerline, starting with the middle or edge of the zone at the center of the detector array and the lanes' centerline, and uses scaling matrix$_{optic}$ (matrix$_{scale}$) to define 12 meter (40 foot) separations between the subsequent boundaries of detection zones. For this configuration, the logic for zone identification is changed to maximize the number of detection zones per lane consistent with the maximum interface of 32 zones.

III Zone Status Module

The zone status module compares the corrected centroid A$_{Sub,i}$ to the spatial boundaries established by matrix$_{final}$ for each of the detect zones and to the previous history of the centroids. The status buffers for vehicles present are in the zero state whenever a zone is clear of traffic. When the centroid satisfies the truth logic in sequential frames, the status buffer assigned to that detection zone is set to the "High Value". The status buffers for vehicles present are in the zero state whenever a zone is clear of traffic. When the status buffer for vehicle present is set to high, the status will remain high until the centroid (vehicle) resumes motion out of the detection zone or until a new centroid (vehicle) occupies the same space. This is to protect against the situation when a tall object occults an object that has been detected.

Analytical estimates of the photometric radiometry imply that the preferred camera system for traffic surveillance as a function of lighting and weather varies between the visible and the infrared (IR) spectral bands. Visible cameras are preferred (because of lower cost and higher reliability) whenever the site illumination is augmented by proper road side lighting. However, the IR cameras provide images that are relatively independent of illumination (night versus day) and they have fewer artifacts from shadows, stray lighting and color contrast. In addition, they can readily identify if a fire is associated with an "incident" for a special alert signal.

Two systems may be used as parallel inputs to the zone status module, since this SVC is self scaling to the true (object size) space, as discussed in the site adaptation module section above. The exact number of objects per zone or lane is determined by the comparison of the corrected centroid coordinates in the true space to verify if the centroids of one system correspond with the same object of the second system. In a two system installation, the simultaneous stereo reconstruction of objects may be used for vehicle classification and will provide the positive identification of an object that may be occulted by a large object is a single camera intersection installation. If two systems of the invention are interfaced to one traffic controller and if each system operates in a separate band of the electromagnetic spectrum (e.g. visible and IR), the synergistic effects of two parallel systems provide the highest confidence of detection.

The zone status module will supply encoded data to the receiver card in the traffic controller's panel. The following is an example of how six parameters may be encoded with only XX bits per detection.

1. Total Objects Present: 0, 1, 2, or 3 in each detection zone (2 bits).

2. Incident Detection: The system will set a priority bit (1 bit) to the high state when it identifies a recent non-moving object plus traffic that switches lanes prior to the non-moving object over an extended time period (i.e., 2 minutes). This signal may be used to alert authorities for special attention. A second bit may be added to accommodate "fire present" in the field of view.

3. Objects Through Intersection: The total of objects that traveled through the intersection on a per lane basis (3 bits). The last three bits of the 16 bit accumulative counters of the receiver card in the traffic control panel are synchronized to the last three bits of the DPE's accumulative counter.

4. Average Object Velocity: The average object velocity per zone (4 bits) using an equation for a single sample such as:

$$V_{Object} = \frac{Centroidchangeperframe}{f(scaling)(secondsperframe)} = K(Centroidchangeperframe) \quad \text{Eq. 13.}$$

Four bits will track an incremental change per 0.1 second with a resolution of 2 mph. and finer resolution and quicker updates may be achieved by assigning more bits to the data word. The last four bits of the accumulative counters of the receiver card in the traffic control panel are synchronized to the last four bits of the DPE's accumulative counter.

5. Average Traffic Velocity: The average change in traffic velocity prior to a yellow or a red light is reported as above.

6. Object classification: A binary code will classify objects into type and size vehicles.

These six parameters indicate that the Zone Status Module capability exceeds the capability of the currently used loop sensor systems and how the SVC will satisfy the future interface requirements for the traffic light controllers.

IV Data Transmission Module

The SVC data transmission module provides the power and data interface for the single video camera assembly. In a hardwired system, standard shielded cables provide the low voltage power and transfer the data to the system's interface card in the traffic light control panel. In a remote, wireless installation, the power is supplied from a solar panel and back-up batteries. For a wireless configuration, a data rate under 5,000 bits per second is desired for good transmission, low power requirements, and an interface that is compatible with most wireless systems over the short range between the camera assembly and the traffic light control panel. In future applications, the traffic controller will be co-located and become part of the data transmission module. In that configuration, the data transmission module will provide direct command to each traffic control lamp at the intersection.

In the simplest form, the data transmittal is a 32 word data string transmitted once per frame (every 0.200 second). In this 32 word transmission, each word represents the data content for an emulated road embedded inductive loop. When the word is only 1 bit in length, a low (0 state) implies that the lane is empty or free of waiting traffic, and a high (1 state) implies that the lane is occupied (waiting for a green light). If 2 bits are assigned to each of the 32 detection zone's buffers, then the presence of 0, 1, 2 or 3 objects per zone would be transmitted in a 64 bit transmission where each word has 2 bits. Increasing the data for each of the 32 words (zones) and using standard data multiplexing techniques each of the 6 functional outputs of the zone status module can be transmitted within the 5,000 bits per second (5 KHz) data rate goal for the low power, wireless transmission. The design parameters to multiplex or compact the data for this interface are commonly known to those familiar with this art.

It is desirable to provide for fail safe operation of the systems of the invention in traffic control use. If the contrast of the image is too low or there is no signal from the systems, then the control of traffic is returned to the traffic controller's timer which would be optimized based on the most recent traffic patterns.

When mounted at a traffic intersection as illustrated in FIG. 4, this single video camera system overcomes the disadvantages of the currently used video camera traffic surveillance systems as follows:

(H) Provides the surveillance of an entire intersection from a nominal 10 meters (approximately 32.8 feet) installation height.

(I) Requires no site-specific programming, no site preparation and no road bed intrusion or underground work.

(J) Can be retrofitted in existing systems by mounting a single camera and replacing the interface cards in the traffic control panel.

APPLICATIONS FOR THE SURVEILLANCE SYSTEMS

In the preferred embodiment, the surveillance systems of the invention can be used in many applications. As mentioned above, they may be used as vehicular traffic surveillance and control systems and/or as traffic incident detection alert and avoidance systems. Of particular interest will be the integration of an intelligent traffic controller logic within the DPE, and then providing traffic light control as a signal superimposed upon the single power line that would be common to all lights. Within each traffic signal lamp housing, the electronics will recognize and execute its unique command for the individual lamp and will return an "ON" verify for each lamp when it is drawing power. Separate logic in the SVC controller monitors each command signal and verify signal for proper response and for conflicts between prohibited combinations.

One version of the traffic SVC system is designated for traffic engineering studies and surveys. This SVC version records the camera video for later analysis. The data acquired, when this engineering version is installed at the location of a future SVC system, may be used to optimize and verify site files for predicted traffic and predicted detection zones.

The surveillance systems may be used as an engineering instrument to simultaneously monitor and establish temporal occupancy and vehicle classification of many traffic lanes. The traffic surveillance systems of the invention will be useful in the IVHS architecture with the proper interface. The systems of the invention will then be able to provide the surveillance data for whatever incident detection, traffic control, or any other function that will be implemented in the IVHS architecture that will be adopted in 1996.

FIG. 5 is an illustration of data acquisition systems, such as close-up fine resolution video cameras or directional audio systems, that are aimed at the coordinates defined by the surveillance system of this invention. The surveillance system of the invention establishes a baseline image of the volume of interest and then provides to each auxiliary system the azimuthal and elevation angle (X, Y, and Z coordinates) of each object present in that volume relative to that baseline. A simple time sequence program may activate an alarm and/or recording from these systems when an object, or an improper number of objects, are present in this, or specific detection areas within this, volume. Naturally, an external command or alarm may also activate the simultaneous data acquisition of objects at the coordinate defined by the system of this invention.

In other configurations, the surveillance systems of the invention are also useful for indoor and outdoor security surveillance of buildings and surrounding grounds. Using the systems of the invention, perimeters of neighborhoods or communities can be surveilled for intrusions by nefarious individuals. Private security guards or the police can then be alerted to take appropriate action. The systems may be used to detect and deter vandals and other nefarious intruders at parking lots, airfields and cemeteries. In fact, the surveillance system of the invention may be installed on the underside of an airplane so that surveillance may be accomplished whether the airplane is airborne or on the ground. The systems of the invention may be used as part of the national effort to police the borders and to allow the border guards to deter and capture illegal immigrants or terrorists.

The systems of the invention may also be used in industrial processes and automation. In industrial processes, the systems can provide input to robotic controllers.

The system of the invention may be used as a targeting system to control the surveillance area of higher resolution systems. If (a) an infrared unit of the invention or (b) a visible unit of the invention or both (a) and (b) are used with (c) a high resolution slave camera or Camcorder, then software or firmware can cause the output of (a) and/or (b) to cause slave camera (c) to turn on, if necessary, and point at the proper elevation and azimuth to acquire a "target" within an area of interest under surveillance by (a) and/or (b). A directional microphone can also be aimed simultaneously with the high resolution camera.

One of the problems of video surveillance systems is that often the individual who is employed to watch the monitor displaying the area of interest being surveilled by the system must be constantly alert to see a possible incident that may only occur sporadically. Constant vigilance can lead to mind-numbing tedium. In that case, the individual may not be alert when the incident does occur. Consequently, the individual cannot take appropriate action.

However, the surveillance systems of the invention can be programmed to alert the individual that an incident has occurred that requires his attention and action. The surveillance systems can generally show what is happening and the area where it is happening. For example, a vehicle may suddenly appear in the middle of the night near a residential, commercial or government building or parking lot. Or burglars may appear in a bank after business hours. The low voltage surveillance systems may have battery back-up power in case power lines are cut by the burglars. The high resolution slave cameras can then show the individual at the monitor the vehicle and its license plate and the burglar's face. The system may instead sound an alarm or send an alert to the police by radio, e.g., on CB band or cellular telephone.

Other applications will occur to those skilled in the art of surveillance and control systems.

The facilities and areas where the surveillance systems of the invention may be used are quite varied. For example, the systems are useful for the surveillance of the exteriors of residential buildings such as private homes, garden apartments and high rise developments and projects. Interiors of buildings, such as lobbies and elevators may be surveilled. Parking lots and garages adjacent to those buildings may also be surveilled.

National monuments may be surveilled to prevent or detect acts of vandalism or terrorism. Museums and other collections of priceless art are subject to burglary, but in many currently used video surveillance systems, the pictures of the culprits are generally of low resolution and therefore of minimal use to law enforcement authorities. However, the surveillance systems of the invention incorporating high resolution slave cameras focused on the culprits can provide useful pictures of the culprits. The surveillance systems of the invention can be designed in small packages having low power requirements and can be almost undetectable by the culprit.

Airports, particularly those near bodies of water, attract large birds such as geese that can cause severe damage to airplanes and even fatal accidents when the geese are ingested into an airplane's jet engines. Current methods to discourage the birds from being on or near the airfields have not achieved notable successes. However, the surveillance systems of the invention can detect the sporadic wandering of the geese near, on or over the airfields and can automatically make noises or take other action to discourage the birds and cause them to leave the vicinity of the airfields.

Another use at airports and at docks, railroad yards, warehouses and construction projects is to detect theft. Employee pilferage and customers' shoplifting from drugstores, department and specialty stores may also be detected by the systems of the invention.

Security systems may incorporate the surveillance systems of the invention for facilities such as stadiums, football fields, water towers, schools, courthouses, churches, synagogues, mosques, power plants, particularly nuclear plants, produce and fish markets, and military installations for the Navy, Air Force, Army, Marines and Coast Guard. In addition to providing security at football stadiums, the systems can also provide a panoramic view of football plays as they might look from a blimp overhead. Such views can prove invaluable in training and in "Monday morning quarterbacking."

"Attractive nuisances" such as railroad tracks, overpasses etc. may be surveilled to detect and alert private security forces or police to take action before children or other immature or malevolent individuals injure themselves or others.

The following examples further illustrate preferred embodiments of the invention.

EXAMPLES

FIG. 1 illustrates the preferred embodiment (second prototype) of the optical hardware used to demonstrate the distortion free ±80 degree elevation by 360 degrees azimuthal field of view systems of the invention and that was also used to demonstrate the simplicity of installation and operation, as demonstrated by the first prototype system described below.

Example 1
Traffic Surveillance System

In the first prototype system, a standard 8 mm Camcorder and its lens system were used in the manual mode with the focus set at infinity (∞) and the field of view set for about ±15 degrees. The camera was focused with a standard 50.8 mm diameter, 127 mm focal length plano-convex lens purchased from a catalog and placed about 75 mm from the camera lens's front surface. It was focused on the virtual images of the distant objects as viewed through the primary mirror, which was a 55 mm diameter aluminum-coated condenser lens with a paraboloidal surface having a directrix of some 12.5 mm. A simple bracket constructed from Delrin® acetal resin was used to center a 2 mm wall, 60 mm diameter glass cylinder to the camera's optical axis. This cylinder supported both the plano-convex lens and mirror. The primary mirror was mounted with a ±25 mm adjust range, to demonstrate the insensitivity of the viewed images versus the despace between the optical elements. The Delrin® acetal resin bracket that aligned the cylindrical glass tube, lens, and mirror assembly to the camera lens axis, also was used to mount the system to the supporting structure during field testing.

An experimental field test was conducted at a traffic intersection by installing the above-mentioned prototype system as follows:

1. The individual who was to install the prototype was simply instructed to install it on the traffic side of an existing pole near the intersection at a height between 20 and 30 feet (7 to 10 meters), with the camera pointing up toward the mirrored lens. The individual who installed the prototype was instructed only in how to turn the battery-operated Camcorder system on and off.

2. He was deliberately not told what the function or the purpose of system was or how to align the system relative to the intersection. The individual mounted the system on a wooden pole at a height of about 25 feet (8 meters). Midway through the field test, the individual inspected the system to verify that the power was enabled. During this inspection, the camera settings were adjusted. After the field testing, the camera lens settings were observed to be focused at 1 meter (not at infinity) with the field of view set to the maximum (±30 degrees, not ±15 degrees).

The recorded field of view was 360 degrees, with a central area of obscuration below the camera. Image data recorded by the camera were then processed through a frame grabber on a personal computer with an Intel 80386, 25 MHz microprocessor. The centroiding of moving objects, tabulating of centroids, fitting second order polynomials to emulate the traffic lane centerlines, solving for intersections between curves and then defining the emulated inductive loops, is then executed with the ease that was indicated using data from the analytical models.

In contrast to conventional prior art systems, the surveillance systems of this invention only require reasonable image quality to detect images that are larger than 1% of the system's field of view. Consequently the use of the system's optical configurations, even though they provide images which are not diffraction limited, is both acceptable for applications similar to those described herein, and is unique.

Example 2
Traffic Surveillance System with Distortion Free Optical System

The extreme radial distortion between the flat object space of traffic intersections and the camera array from the optical system of Example 1 was eliminated by a distortionless optical system illustrated by FIG. 1. This catadioptric lens system provided a 360 degree field of view with a 10 to 80 degree elevation. However, in contrast to the radial distortion from the first prototype system, this catadioptric lens system provided a constant object to image scaling over the entire field of view. The optical prescription for the afocal system (lens elements 10, 12, 13, and 14) shown in FIG. 1 is defined in Table 1.

acquired from a height exceeding 40 feet. After a simple rotation, rescaling, and offset, the twelve (12) traffic lane intersects were coincident within ±one foot. As before, the video data was acquired on a 8 mm cassette recorder and processed on a PC. The video frames of the same intersection, but from different elevations and azimuthal angle were compared. After a simple scaling and rotation,

TABLE 1

OPTICAL PRESCRIPTION

| Surface | Radius | Thickness to next Surface | Aperture Radius | Media | Comments |
|---|---|---|---|---|---|
| Entrance Pupil | | | 3.0 | Air | |
| Space | | 25.000 | 12.50 | Air | |
| Achromat | | | | | ES_N32321 |
| 1 | 152.94 | 2.500 | 12.50 | SF 10 | |
| 2 | 18.85 | 9.500 | 12.50 | H_BAF11 | |
| 3 | 27.970 | 13.689 | 12.50 | Air | |
| Plano Concave | | | | | LPK003 |
| 1 | ∞ | 2.000 | 12.50 | BK7 | |
| 2 | 12.968 | 6.536 | 12.3 | Air | |
| Meniscus | | | | | LMP001 |
| 1 | 33.720 | 4.000 | 12.50 | BK7 | |
| 2 | 90.000 | 74.194 | 12.30 | Air | |
| Aspheric Mirror | | | | | Diamond Turned |
| 1 | 10.213 | 100.000 | 41.275 | Reflect | See Constants |

Constants: $CC = -3.1665$ $AE = -5.4478E-10$ $AF = 3.6773E-13$ $AG = 8.622E-17$

The above design was executed to be optimum with a 0.3 inch (diagonal) video array. In practice, a 0.5 inch (diagonal) CCD array was integrated to evaluate the performance of the entire field of view which includes the distortion at the field of view edge. These camera will be replaced by a compact (customized) camera, having a 0.3 inch array, as part of the field testing and design optimization for production.

The following Table 2 is an extract of the performance predication report for the system operating with a 6 mm pupil. However, in operation, the aperture was reduced and the resolution appeared to be significantly better than this predication.

TABLE 2

| Radius | Object Space Distortion[1] | | Blur Size 80% Energy[2] | |
|---|---|---|---|---|
| Meters | Millimeters | Inches | Millimeters | Inches |
| 5 | 31 | 1.2 | 317 | 12 |
| 10 | −58 | −2.2 | 205 | 8 |
| 15 | −168 | −5.4 | 212 | 8 |
| 20 | −77 | −3.0 | 441 | 17 |
| 25 | 85 | 3.3 | 643 | 25 |
| 30 | 204 | 8.0 | 715 | 28 |
| 35 | 148 | 5.8 | 629 | 24 |
| 40 | −71 | −2.8 | 459 | 18 |
| 45 | −215 | −8.5 | 512 | 20 |
| 50 | 122 | 4.9 | 652 | 25 |

[1]The object space distortion is the error between the theoretical location and the centroid of some two hundred rays drawn from the theoretical field angle in the image plane. [2]The blur size is the diameter that inscribe 160 of the 200 rays at the object plane.

As with the first prototype system, no effort was made for azimuthal alignment or for the alignment of the surveillance system to gravity. This system was installed at elevations varying from 15 feet to more than 45 feet above the road bed. These tests conclusively demonstrated that the images of constant rate vehicles do move at fixed rates with no perceivable field angle distortion. Likewise, video data acquired from under 30 feet was compared to the data data sets could be correlated and processed for substraction and image motion detection.

It will be further apparent to one skilled in this art that the improvements provided for in the present invention, while described with relation to certain specific physical embodiments, also lend themselves to being applied in other physical arrangements not specifically provided for herein, which are, nonetheless, within the spirit and scope of the invention taught here.

I claim:

1. An adaptive learn mode method applied to the digital, time tagged, video data of a traffic surveillance system which eliminates or minimizes the need for operator intervention during setup or use of the surveillance system and the surveillance system's data processing, wherein the adaptive learn mode method comprises a set of steps to establish and update functions that scale and align a coordinate system defined in object space to that of the coordinate system defined in surveillance camera's pixel space, or image plane, so that a-priori limits, boundaries, images and criteria established in object space may be applied to the acquired data in pixel space, wherein the said adaptive learn mode method comprises:

a. executing one set of steps if installation site-specific data files are present;

b. executing a different set of steps if installation site-specific data files are not present and the data processing determines that the parallelism of object motion, or traffic lanes, are within a specified limit, i.e., the slopes of all best fit matrix equations are within the equivalent of some angle implying that an intersection is not present; and c. executing a different set of steps if installation site-specific data files are not present and the data processing determines that the parallelism of object motion, or traffic lanes, exceeds a specified limit, i.e., the slopes of all best fit matrix equations equals or exceeds the equivalent of some angle implying that a standard intersection is present.

2. An adaptive learn mode method, according to claim 1, wherein the said adaptive learn mode method has determined to require site-specific data files in order to scale and align a coordinate system defined in object space to that of a coordinate system defined in pixel space so that a-priori limits, boundaries, images and criteria established in object space may be applied to the acquired data in pixel space, the said adaptive learn mode method comprising:

a. steps for verifying the presence of four site-specific data files comprising:
  i. a file for predicted traffic patterns, comprising a matrix of matrix equations, herein identified as $matrix_{traffic}$ to define predicted traffic centerlines as determined by traffic surveys or engineering studies, each matrix equation being unique to a specific lane and specified in a standard three dimensional coordinate system common to all object space information for the system, said coordinate system being based upon application site drawings with the origin specified as the intersect of the object surface and the axis of the controlling surveillance sensor or other fixed feature, the major axis being aligned parallel to the primary flow of traffic;
  ii. a file for optimum location and shape of detection zones, comprising a matrix of matrix equations, herein identified as $matrix_{zone}$, to define each boundary of ideally located detection zones that are determined by traffic surveys or engineering studies, each matrix equation being specified in the standard coordinate system common to all object space information for the system;
  iii. a file for installation error correction, comprising a matrix, herein identified as $matrix_{optic}$, to define the ideal optical scaling between object space and pixel space for the system installation with no positional or angular installation errors;
  iv. a file for installation error correction, comprising a matrix, herein identified as $matrix_{install}$, to define the correction sensitivities for $matrix_{optic}$ for a unit of translational and angular error in surveillance sensor placement or alignment, the amplitude of the correction sensitivities being defined by a matrix, herein identified as $matrix_{weight}$;

b. steps to compute a matrix of matrix equations, herein identified as $matrix_{observed}$ from the corrected centroids or vectors in the time tagged data in pixel coordinates comprising:
  i. the corrected centroids defined as the standard mathematical centroids, or other computed values, of derived images from objects that are nominally the height of a standard vehicle, the departure of an object's height from that of a standard height providing a shift in width and length in a known direction as a function of field position, whereby when an image appears wider than a standard width, which is specified as a function of field position, the centroid is compensated to the height of the standard, and the date file for that image is updated with the object height for subsequent processing, and where the corrected centroid is the standard mathematical centroid, or other computed value, when standard width is not specified as a function of field position;
  ii. a matrix equation, for $matrix_{observed}$, is fitted to each traffic lane by a set or regression rules applied to the sorted time tagged corrected centroids, said regression rules rejecting the data that is not within a specified confidence limit and rejecting equations that have insufficient data;
  iii. a matrix equation, for $matrix_{observed}$, may be optionally fitted to each traffic lane by a set of regressions rules applied to image vectors from the same derived image data sets;

c. steps to compute the transfer function, herein identified as $matrix_{scale}$, that sets $matrix_{traffic}$ equal to, or at optimized correlation with, $matrix_{observed}$ by the periodic refinement of $matrix_{weight}$;

$matrix_{scale} \cong f(matrix_{observed}, matrix_{traffic}) \cong g(matrix_{optic}, matrix_{weight}, matrix_{install})$;

d. steps to align and scale the ideal detection zones defined in object space into pixel space by applying the matrix product of $matrix_{scale}$ to each matrix equation of $matrix_{zone}$ defining a new matrix, herein identified as $matrix_{final}$, which are the pixel space boundaries to define the acceptance limits for corrected centroids or vectors, that are equivalent to objects within the bounds of the detection zones on the ground; and e. steps to identify when an object of interest, the corrected centroid of vector of the processed image, is within the boundaries of a detection zone, where said steps comprise:
  i. setting a true state for each boundary equation of $matrix_{final}$ when the image corrected centroid or vector satisfies that applicable boundary condition and setting a true state for each zone when each boundary condition for that zone is verified true, or
  ii setting a true state for each zone of $matrix_{final}$ when the coordinate of an image corrected centroid or vector matches a value in a look-up table which establishes the correlation of all pixels located within the appropriate boundaries of that said zone.

3. An adaptive learn mode method, according to claim 1, wherein the said adaptive learn mode method has determined both that installation site-specific data files are not required and that an intersection is not present, as determined by the parallelism of traffic lanes being within a specified limit, i.e., the slopes of all $matrix_{observed}$ equations are within the equivalent of some angle implying that an intersection is not present, the said adaptive learn mode method will implement the following in order to apply a-priori object space limits; boundaries, images and criteria to the acquired data in pixel space comprising;

a. steps to compute a matrix of matrix equations, herein identified as $matrix_{observed}$, from the corrected centroids or vectors in the time tagged data in pixel coordinates comprising:
  i. the corrected centroids defined as the standard mathematical centroids, or other computed values, of derived images from objects that are nominally the height of a standard vehicle, the departure of an object's height from that of a standard height providing a shift in width and length in a known direction as a function of field position, whereby when an image appears wider than a standard width, which is specified as a function of field position, the centroid is compensated to the height of the standard, and the data file for that image is updated with the object height for subsequent processing, and where the corrected centroid is the standard mathematical centroid, or other computed value, when standard width is not specified as a function of field position;
  ii. a matrix equation, for $matrix_{observed}$, is fitted to each traffic lane by a set of regression rules applied to the sorted time tagged corrected centroids, these regression rules rejecting the data that is not within a specified confidence limit and rejecting equations that have insufficient data; and iii. a matrix equation, for $matrix_{observed}$, may be optionally fitted to each traffic lane by a set of regression rules applied to image vectors from the same original derived image data set;

b. steps to align and scale the emulated detection zones of object space into pixel space comprising:

i. lane widths defined by the difference between adjacent traffic centerlines, independent of traffic direction, where each centerline is defined by a unique matrix equation of $matrix_{observed}$;

ii. detection zone boundaries between adjacent lanes, herein identified as a matrix equation in $matrix_{zone}$, defined by the average of the two lane centerlines where each centerline is defined by a unique matrix equation in $matrix_{observed}$;

iii. detection zone boundaries to the side of a lane with no adjoining lane, herein identified as a matrix equation in $matrix_{zone}$, defined by the lane's centerline defined by a unique matrix equation in $matrix_{observed}$ plus, or minus, one half the lane's width as established above in (b)(i);

iv. detection zone boundaries, herein identified as matrix equations in $matrix_{zone}$, defining the zone's length and location along each lane's centerline defined by a matrix equation normal to the matrix equation of the lane's centerline as defined in $matrix_{observed}$ and placed at an equivalent object distance, i.e., three-and-one-half (3½) lane widths, between boundaries starting near and symmetric about the optical system's centerline;

v. detection zone encoding being modified by a look-up table to maximize the number of detection zones consistent with the number of lanes and a specified maximum number of detection zones, i.e. 32 identifiers;

vi. when site specific files are not present, $matrix_{scale}$ is unity and $matrix_{zone}$ equals $matrix_{finial}$; and c. steps to identify when an object of interest, the corrected centroid or vector of the processed image, is within the boundaries of a detection zone in pixel space, wherein said steps comprise:

i. setting a true state for each boundary equation of $matrix_{final}$ when the image corrected centroid satisfies that applicable boundary condition and setting a true state for each zone when each boundary condition for that zone is verified true, or ii. setting a true state for each zone in $matrix_{final}$ when the coordinate of an image corrected centroid or vector matches a value in a look-up table which establishes the correlation of all pixels located within the appropriate boundaries of that said zone.

4. An adaptive learn mode method, according to claim 1, wherein the said adaptive learn mode method has determined both that installation site-specific data files are not required and that an intersection is present, as determined by the parallelism between traffic lanes being equal to or exceeding a specified limit, i.e., the slope between certain $matrix_{observed}$ equations are equal to or greater than the equivalent of some angle implying that an intersection is present, the said adaptive learn mode method will implement the following in order to apply a-priori object space limits, boundaries, images and criteria to the acquired data in pixel space comprising:

a. steps to compute a matrix of matrix equations, herein identified as $matrix_{observed}$, from the corrected centroids or vectors in the time tagged data in pixel coordinates comprising:

i. the corrected centroids defined as the standard mathematical centroids, or other computed values, of derived images from objects that are nominally the height of a standard vehicle, the departure of an object's height from that of a standard height providing a shift in width and length in a known direction as a function of field position, whereby when an image appears wider than a standard width, which is specified as a function of field position, the centroid is compensated to the height of the standard, and the data file for that image is updated with the object height for subsequent processing, and where the corrected centroid is the standard mathematical centroid, or other computed value, when standard width is not specified as a function of field position;

ii. a matrix equation, for $matrix_{observed}$, is fitted to each traffic lane by a set of regression rules applied to the sorted time tagged corrected centroids, these regression rules rejecting the data that is not within a specified confidence limit and rejecting equations that have insufficient data; and iii. a matrix equation, for $matrix_{observed}$, may be optionally fitted to each lane that is defined by image vectors from the same derived image data set;

b. steps to align and scale the detection zones of object space into pixel space comprising:

i. lane widths defined by the difference between adjacent traffic centerlines, independent of traffic direction, where each centerline is defined by a unique matrix equation of $matrix_{observed}$;

ii. detection zone boundaries between adjacent lanes, herein identified as a matrix equation in $matrix_{zone}$, defined by the average of the two lane centerlines where each centerline is defined by a unique matrix equation in $matrix_{observed}$;

iii. detection zone boundaries to the side of a lane with no adjoining lane, herein identified as a matrix equation in $matrix_{zone}$, defined by the lane's centerline defined by a unique matrix equation in $matrix_{observed}$ plus, or minus, one half the lane's width as established above in b) i);

iv. detection zone boundaries, herein identified as matrix equations in $matrix_{zone}$, defining the zone's length and location along each lane's centerline, i.e., three-and-one-half (3½) lane's width between adjacent boundaries, with said boundary defined by matrix equations normal to the matrix equation of the lane's centerline as defined in $matrix_{observed}$, and with the first boundary for each said lane at a length, i.e. one-half of a lane's width, from the lane's reference, wherein the said lane's reference is defined as the intercept coordinate of the said lane's centerline and other traffic lane centerlines as determined by a matrix application of the constants of $matrix_{observed}$, and also as the intercept coordinate along the direction of traffic closest to the maximum of centroids per unit lane length, where this maximum is due to slowing and static objects in queue for a red light or stop sign; and c. steps to identify when an object of interest, the corrected centroid or vector of the processed image, is within the boundaries of a detection zone wherein said steps comprise:

i. setting a true state for each boundary equation of $matrix_{final}$ when the image corrected centroid or vector satisfies that applicable boundary condition and setting a true state for each zone when each boundary condition for that zone is verified true, or ii. setting a true state for each zone of matrix$_{final}$ when the coordinate of an image corrected centroid or vector matches a value in a look-up table which establishes the correlation of all pixels located within the appropriate boundaries of that said zone.

5. An adaptive learn mode method, according to claim 1, wherein the said adaptive learn mode method provides the steps for automated detection zone identification and statistical reporting wherein the said adaptive learn mode comprises:

a. sorting the matrix equations of matrix$_{final}$ to uniquely pre identify and encode each detection zone, comprising;

i. labeling each lane and it's detection zones as either an approach to or departure from the lane's intersection or the geometric center if an intersection is not present;

ii. sequentially labeling each lane, and zone in each lane, by established criteria and pattern so that all zone related data that is so labeled will be uniquely and properly identified by the applying the said established criteria and pattern to the reported data;

iii. implementing a-priori zone reporting sequence for each established criteria and pattern and thereby eliminating the requirement to attach a unique zone identifier to the reported data stream; and b. reporting the look up table parameters associated with each detection zone, which parameters for each detection zone may include the current number of corrected centroids within the zone, the total number of centroids per unit time, the average centroid rate of motion, vehicle classification, and other definable statistics wherein the reported values may also be the change in absolute values with the absolute value only reported on an infrequent basis.

6. A refractive optical element of a catadioptric optical system comprising at least one refractive optical element and at least one mirror, wherein the said refractive optical element provides the structural support and alignment stability between other optical elements and a mirror, and also provides the protective environmental enclosure of the optical elements and the mirror, and introduces no obscuration and/or vignetting of images for the field of view about the optical axis, and where one surface of the refractive optical element is the last surface, excluding films and coating surfaces, of the optical system, and where the said refractive optical element has the form where the radial distances from the optical axis to the inner and outer surfaces are symmetrical about the optical axis and varies as function of axial position to form a walled cylinder or the partial shell of a truncated cone, sphere, or asphere.

7. A refractive optical element of a catadioptric optical system comprising at least one refractive optical element and at least one mirror, according to claim 6, wherein the said refractive optical element provides the structural support and alignment stability between other optical elements and a mirror, and also provides the protective environmental enclosure of the optical elements and the mirror, and introduces no obscuration and/or vignetting of images for the field of view about the optical axis, and where one surface of the refractive optical element is the last surface, excluding films and coating surfaces, of the optical system, and where the refractive optical element has the form where the radial distances from the optical axis to the inner and outer surfaces are symmetrical about the optical axis and varies as function of axial position to also form a lens element that extends or modifies the field of view or spatial scaling of the system, e.g., may reduce or eliminate central obscuration.

8. A solid, three optical surface, catadioptric element of an optical system, wherein the said catadioptric element provides the structural support and alignment stability between other optical elements and a mirror of the said optical system, and also provides the protective environmental enclosure of the optical elements and the mirror, and introduces no obscuration and/or vignetting of images for the field of view about the optical axis and where one surface of said catadioptric element is the last surface, excluding films and coating surfaces, of the optical system, and where the said catadioptric element's three effective surfaces listed sequentially from the focal plane side, comprise:

a. a first surface, normal to and symmetric about the optical axis, primarily optimized for aberration correction, focus control and secondarily for field angle magnification between image and object space;

b. a second surface which is a mirror normal to and symmetric about the optical axis and optimized as the primary transfer function between radial distance in the focal plane and the object surface and with the mirror surface redirecting the rays between the first surface and a third surface in accordance with basic reflection equations where the reflected and incident angles are of equal magnitude relative to the instantaneous surface normal; and c. a third surface, which is part of the physical surface connecting the first and the second optical surfaces, which is nominally parallel with, and a radial function of, the axial distance along the optical axis and is optimized as the secondary transfer function between radial distance in the focal plane and the object surface, said third surface redirecting the rays between the second surface of the catadioptric element and the object surface in accordance with Snell's basic refraction equation of $n_1 \sin \theta_1 = n_2 \sin \theta_2$, where n is the media's index of refraction, $\theta$ is the ray angle relative to the instantaneous surface normal and the subscripts 1 and 2 indicate the media of the ray, and the shape of this surface also provides modification for aberration correction and focus control.

9. A solid, four optical surface, catadioptric element of an optical system, wherein the said catadioptric element provides the structural support and alignment stability between other optical elements and a mirror of the said optical system, and also provides the protective environmental enclosure for the optical elements and the mirror, and introduces no obscuration and/or vignetting of images for the field of view about the optical axis and where one surface of said catadioptric element is the last surface, excluding films and coating surfaces, of the optical system, and where the said catadioptric element's four optical surfaces listed sequentially from the focal plane side, comprises:

a. a first physical surface which is normal to and symmetric about the axis and has two optical surfaces herein identified as the first optical surface and third optical surface, where:

i. the first optical surface is a transparent central core and may be the system's aperture stop at or near the vertex of a third optical surface;

ii. the third optical surface is a reflective aspheric surface, about the first surface, and is the second reflective element after the aperture stop, where this mirror is optimized as the primary transfer function between radial distance in the focal plane and the object surface, and this surface redirects the rays between the second optical surface, which is also a mirror, and a fourth optical surface in accordance with basic reflection equations where the reflected and incident angles are of equal magnitude relative to the instantaneous surface normal;

b. a second optical surface which is a mirror that is normal to and symmetric about the axial axis, and may be flat or optimized as either, or both, a low power aspheric or an axicon, where its primary function is to redirect the rays of the first optical surface to the third optical surface in accordance with basic reflection equations where the reflected and incident angles are of equal magnitude relative to the instantaneous surface normal; and c. a fourth optical surface, which is part of the physical surface connecting the second and the third optical surfaces, and which is nominally parallel with, and a radial function of, the axial distance along the optical axis and optimized as a transfer function between radial distance in the focal plane and the object surface by redirecting the rays between the catadioptric element's third optical surface and the object's surface in accordance with Snell's basic refraction equation of $n_1 \sin \theta_1 = n_2 \sin \theta_2$, where n is the media's index of refraction, $\theta$ is the ray angle relative to the instantaneous surface normal and the subscripts 1 and 2 indicate the media of the ray, and the shape of this surface also provides modifications for aberration correction and focus control.

* * * * *